United States Patent [19]
Terada et al.

[11] Patent Number: 6,111,883
[45] Date of Patent: Aug. 29, 2000

[54] REPEATER AND NETWORK SYSTEM UTILIZING THE SAME

[75] Inventors: Masato Terada, Sagamihara; Makoto Kayashima, Yamato; Takahiko Kawashima, Yokohama; Tetsuya Fujiyama, Yokohama; Minoru Koizumi, Yokohama; Kazuo Nishimura, Hadano; Kazunari Hirayama; Takaaki Ogino, both of Yokohama, all of Japan

[73] Assignee: Hitachi, Ltd., Tokyo, Japan

[21] Appl. No.: 08/884,133

[22] Filed: Jun. 27, 1997

[30] Foreign Application Priority Data

Jul. 12, 1996 [JP] Japan .................................. 8-182975
Oct. 18, 1996 [JP] Japan .................................. 8-275809

[51] Int. Cl.$^7$ ...................................................... G06F 13/38
[52] U.S. Cl. ........................ 370/401; 370/389; 713/201; 709/229; 709/249
[58] Field of Search .................................... 370/389, 390, 370/392, 400, 401, 402, 410; 395/186, 187.01, 200.33, 200.54, 200.57, 200.59, 200.79

[56] References Cited

U.S. PATENT DOCUMENTS

| | | | |
|---|---|---|---|
| 5,623,601 | 4/1997 | Vu | 395/187.01 |
| 5,689,566 | 11/1997 | Nguyen | 380/25 |
| 5,699,513 | 12/1997 | Feigen et al. | 395/187.01 |
| 5,793,763 | 8/1998 | Mayes et al. | 370/389 |
| 5,802,320 | 9/1998 | Baehr et al. | 395/200.79 |
| 5,826,014 | 10/1998 | Coley et al. | 395/187.01 |
| 5,835,726 | 11/1998 | Shwed et al. | 395/200.57 |
| 5,864,683 | 1/1999 | Boebert et al. | 395/200.79 |
| 5,960,177 | 9/1999 | Tanno | 395/200.59 |

OTHER PUBLICATIONS

"Check Point Fire Wall–1™ White Paper", Version 3.0, Jan. 1997, P/N 400–3000.

*Primary Examiner*—Chi H. Pham
*Assistant Examiner*—Frank Duong
*Attorney, Agent, or Firm*—Antonelli, Terry, Stout & Kraus, LLP

[57] ABSTRACT

In view of providing a network system enabling communication having passed fire walls (repeaters) and assuring high security and operation flexibility through access control based on users and applications, a user-held table indicating correspondence between repeaters and passwords, a repeater-held table indicating correspondence between users and passwords and a table indicating access regions are defined respectively for users, departments of users and official positions of users and a route control information storing table indicating correspondence between networks and next transmitting destination is also provided to execute the access control for each user. Moreover, the repeater is provided with the repeating route control table so that a repeater located in the course of route to the transmitting destination computer and allowing communication from the transmitting side computer is selected from the data repeating control table and the process for requesting the repeating operation of communication with the destination is executed to the selected repeater.

32 Claims, 21 Drawing Sheets

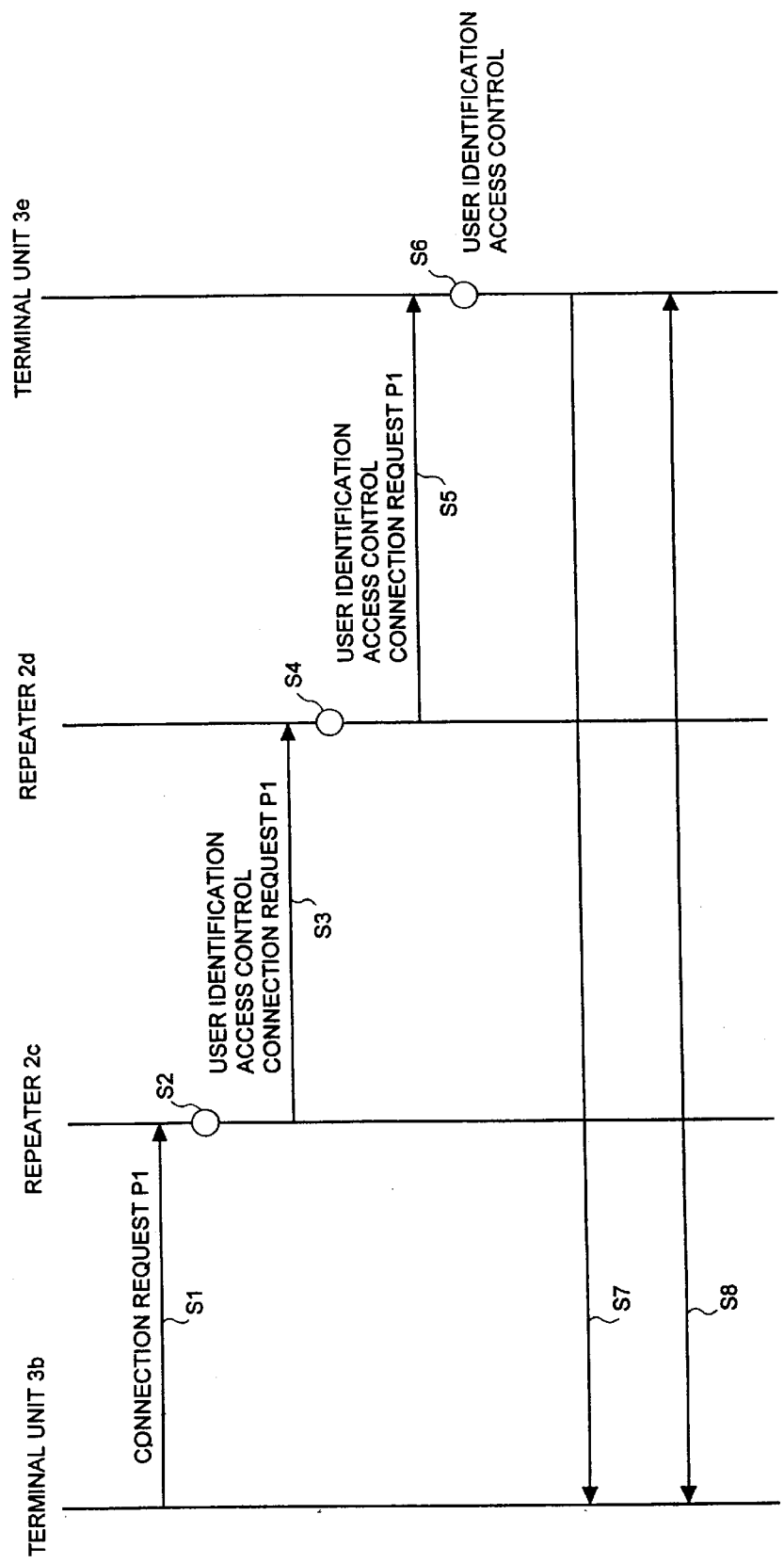

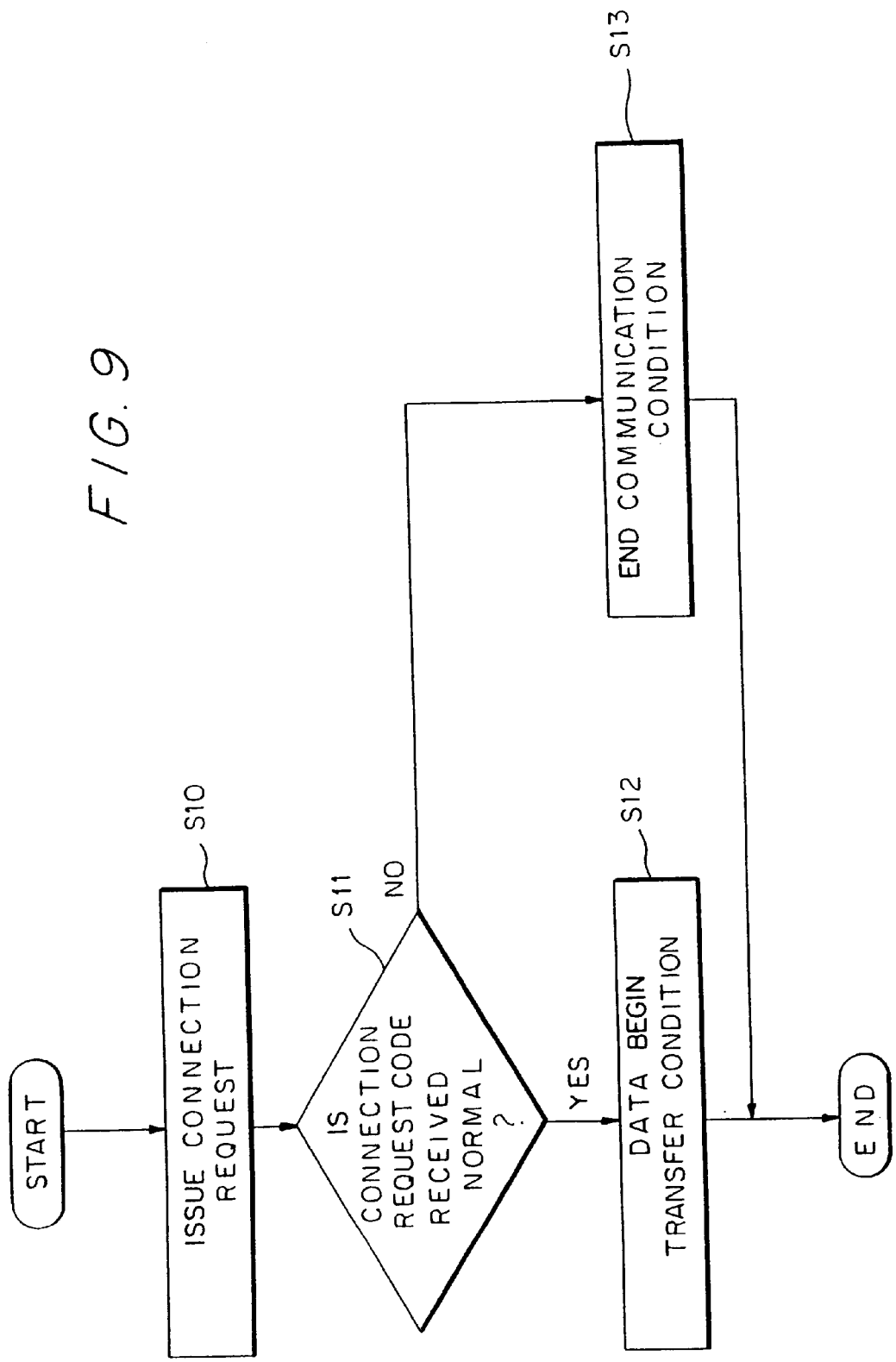

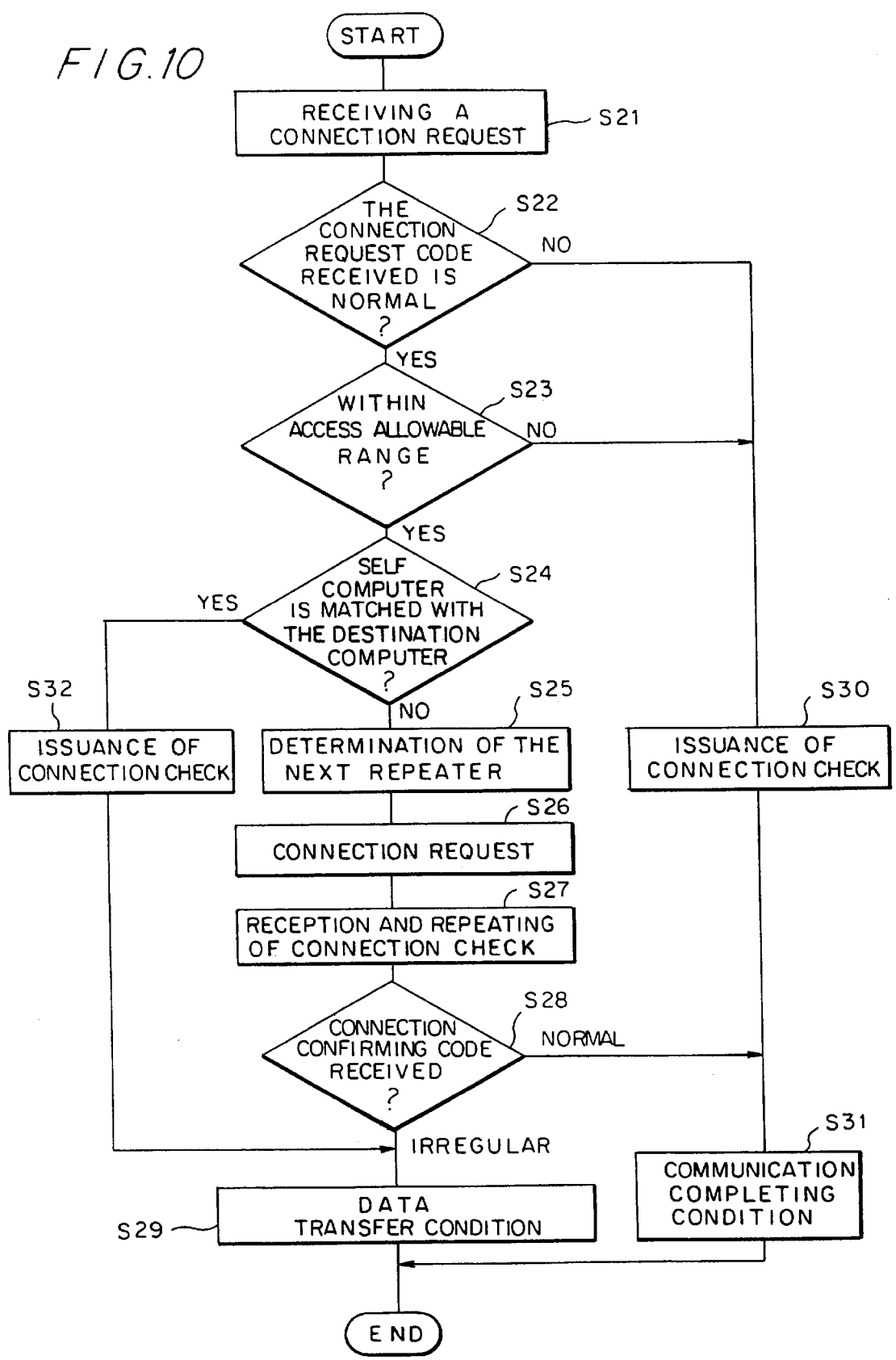

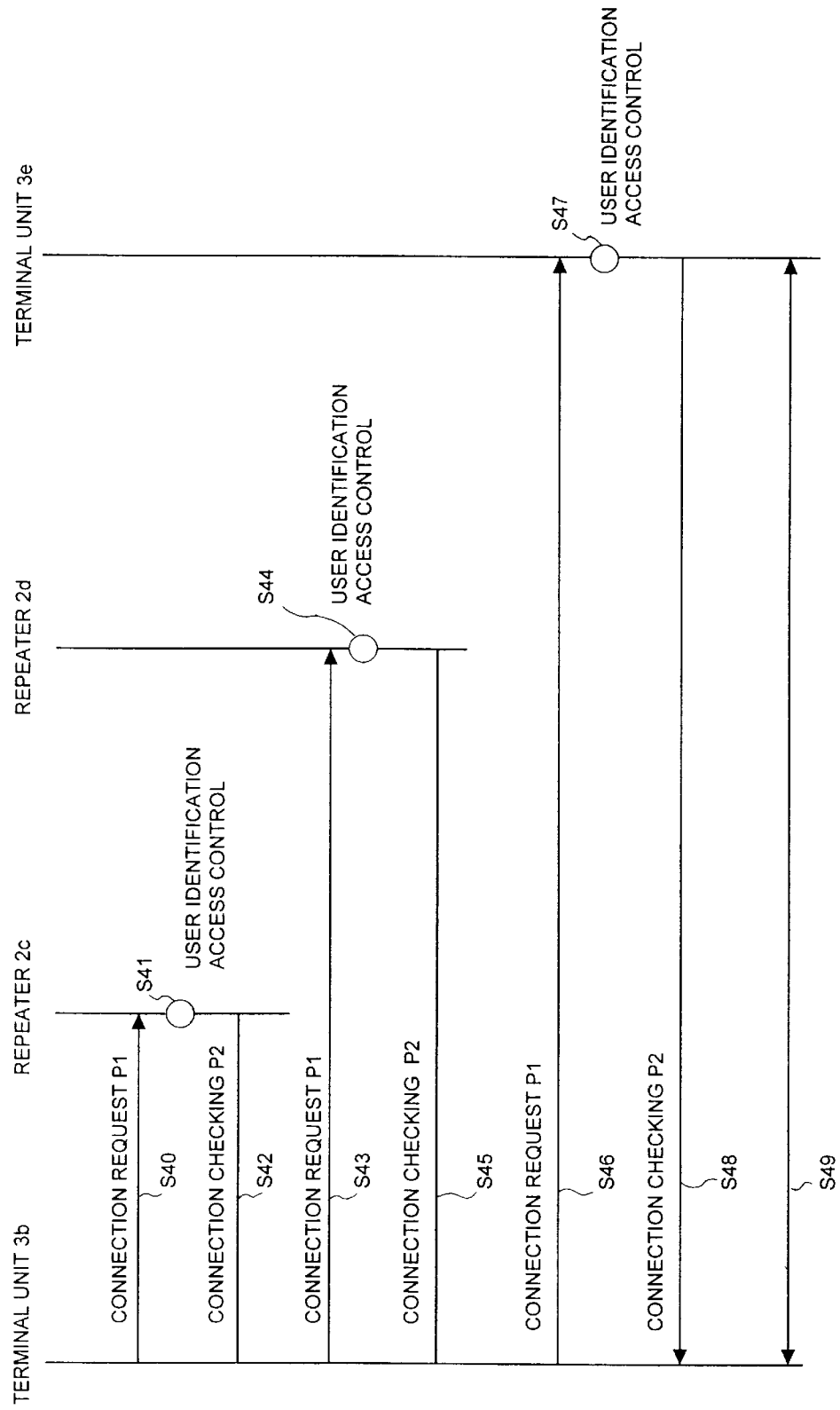

FIG. 14

| REPEATER NAME | IDENTIFICATION INFORMATION |
|---|---|
| REPEATER a | TEST |
| REPEATER b | - |
| REPEATER c | - |
| REPEATER d | - |

FIG. 15

| USER NAME | IDENTIFICATION INFORMATION |
|---|---|
| USER 1 | test |
| USER 2 | abcdx |
| USER 3 | poids |
| USER 4 | odksic |

FIG. 16

| | USER NAME | DEPARTMENT | OFFICIAL POSITION | TRANSMITTING SIDE | DESTINATION | SERVICE |
|---|---|---|---|---|---|---|
| 427a | USER 1 | GENERAL AFFAIRS | GENERAL MANAGER | NETWORK 1 NETWORK 2 | NETWORK 1 NETWORK 2 | FILE TRANSFER |
| 427b | USER 2 | - | SECTION CHIEF | NETWORK 3 NETWORK 5 | NETWORK 3 NETWORK 5 | * |
| 427c | USER 3 | PLANNING | GENERAL MANAGER | * | * | VIRTUAL TERMINAL UNIT |
| 427d | USER 4 | PLANNING | MEMBER | * | * | * |

FIG. 17

| DEPARTMENT 431 | DESTINATION 432 | TRANSMITTING SIDE 433 | SERVICE 434 |
|---|---|---|---|
| PLANNING | NETWORK 2<br>NETWORK 3<br>NETWORK 4<br>NETWORK 5 | NETWORK 2<br>NETWORK 4 | VIRTUAL TERMINAL UNIT |
| DEVELOPMENT | NETWORK 2<br>NETWORK 3<br>NETWORK 5 | NETWORK 2<br>NETWORK 3 | |
| DESIGN | NETWORK 2<br>NETWORK 3<br>NETWORK 5 | NETWORK 2<br>NETWORK 3 | VIRTUAL TERMINAL UNIT<br>FILE TRANSFER |
| GENERAL AFFAIRS | NETWORK 1<br>NETWORK 2 | NETWORK 1<br>NETWORK 2 | DATABASE ACCESS |

430

| | OFFICIAL POSITION | CLASS OF DESTINATION | REMOTE DESTINATION | SERVICE |
|---|---|---|---|---|
| 445a | GENERAL MANAGER | LOCAL REMOTE | * | * |
| 445b | SECTION CHIEF | LOCAL REMOTE | * | VIRTUAL TERMINAL UNIT |
| 445c | CHIEF | LOCAL | - | - |
| 445d | MEMBER | LOCAL | - | - |

Columns: 441, 442, 443, 444 — table 440

FIG. 26

| USER NAME | TRANSMITTING SIDE | DESTINATION | SERVICE NAME | CONDITION | POSSIBILITY OF ACCESS | TIME |
|---|---|---|---|---|---|---|
| USER 1 | TERMINAL b | TERMINAL e | VIRTUAL TERMINAL UNIT | START | IMPOSSIBLE | 1996-2-20 15:30 |
| USER 1 | TERMINAL b | TERMINAL a | FILE TRANSFER | START | POSSIBLE | 1996-2-21 16:00 |
| USER 1 | TERMINAL b | TERMINAL a | FILE TRANSFER | END | | 1996-2-21 17:00 |

REPEATER AND NETWORK SYSTEM UTILIZING THE SAME

BACKGROUND OF THE INVENTION

The present invention relates to security of a computer connected to a network system and particularly to a method of constituting a network system which executes access control and relays communications of applications through mutual cooperation of fire walls.

As a method of preventing invasion into a computer through a network, a repeater (fire wall) has been proposed to give restriction to the access from outside.

A typical fire wall has a function, as is described "Computer Security Resource Clearinghouse" of NIST (National Institute of Standards and Technology), to control the accesses depending on IP (Internet Protocol) addresses of the transmitting side and receiving side and kinds of services and to the store access record.

Moreover, as a repeater for repeating communication between a client and a server, there is provided socks V5 proposed by RFC1928 in the environment where fire walls exists. In the socks, mutual identification between the client and the repeating server and socks protocol for realizing connection instruction for the repeating server are defined and thereby communication between the client and the server having passed one fire wall can be realized.

Moreover, there is a gateway protocol such as RIP (Routing Information Protocol: RFC 1058), OSPF (Open Shortest Path First: RFC 1131), etc. as a mechanism to realize dynamic exchange of repeating route information in the IP layer.

With rapid development of Internet system, a person can get various kinds of information generated in the world on the real-time basis but, on the other hand, a person is in turn threatened to external invasion. As effective measures for such external invasion, it has been proposed to (1) give limitation on IP address for making access to each service and to (2) provide a gateway (fire wall in narrow sense) to store the access record. Use of such fire wall in narrow sense has enabled reduction of threat for an external invader by acquiring matching property of the operating environment of the gateway itself and localizing the range of control by an administrator.

However, in the case of executing the access control utilizing the technique of the related art, since the access control object is based on the information incorporated to a computer such as class of service and IP address, there is a problem that the access control based on users cannot be realized. For example, desired access control becomes impossible for the computer to which the IP address is assigned dynamically and class of service is limited to particular users.

Moreover, in private network utilizing the Internet, a fire wall plays a very important role for security and an internal fire wall is increasingly installed in the private network in order to protect the sub-network. There are several problems to be solved for the communication in the environment where a plurality of fire walls exist. For example, when the communication having passed the internal fire wall for protecting the sub-network is to be attempted from a computer of an external network, the communication must be repeated between the external fire wall and the internal fire wall.

However, since the routing information for the internal fire wall provided for repeating is concealed to the external network, such routing information must be obtained with a certain method. FIG. 1 shows an example of the problem explained above. When a client ex101 attempts to make communication with a server accommodated in the network ex106 of A corporation, an external fire wall ex102 repeats the communication. Since the external fire wall ex102 can obtain the routing information to the server ex104 for communication with the server ex104 in the network ex106 of A corporation, communication can be repeated. However, since the server ex105 is concealed by the internal fire wall ex103 for the communication with the server ex105 accommodated in the sub-network ex107, the external fire wall ex102 cannot obtain the routing information to the server ex105 and thereby this communication cannot be repeated.

Moreover, in the case of the communication between two networks connected through the external network, this communication cannot be realized between respective internal fire walls, unless the routing information for identifying the internal fire wall is set for the external fire wall.

FIG. 2 shows an example of the problem explained above. A client ex201 accommodated in the network ex210 is capable of making communication with a server ex202 in the network ex211 by registering the fire wall ex206 as the route to the server ex202 in the fire wall ex205. However, when a server ex204 is provided in the internal sub-network ex214 of the network ex213, since the route is concealed by the fire wall ex208, the internal fire wall ex209 cannot be registered in the fire wall ex207.

OBJECT AND SUMMARY OF THE INVENTION

It is therefore an object of the present invention to provide a large scale network system which enables communications having passed the fire wall and repeaters (fire walls) used in the same network by solving the problems explained above and offering a means for exchanging the repeating route information among a plurality of repeaters (fire walls).

Moreover, it is also an object of the present invention to provide a network system which enhances security and assures higher operation flexibility and repeaters used therein through the access control based on the computer users and applications.

The objects explained above will be achieved using following means.

(1) Access control based on computer users and applications
   Executing access control as an object of access control on the basis of computer users and applications
(2) Identification of computer users and applications
   Identifying, for executing access control, that the communication is requested by a person who has issued the request.
(3) Data transfer in the repeaters having the access control function
   Providing transparency of communication in the communication between computers having the access control functions The data transfer by the repeaters can be realized by providing, in the repeater, a repeating route control table storing correspondence between the address of the transmitting side computer and the address of the repeater provided to transfer the data to such address and executing the processing to select, from the data repeating route control table, the repeater provided in the course of the route to the target computer in the receiving side to enable the communication from the computer of the transmitting side and the processing to connect the repeating program of the repeater identified by the processing explained above to request the repeating of communication with the receiving side to the repeater.

BRIEF DESCRIPTION OF THE DRAWINGS

While the present invention has been described in detail and pictorially in the accompanying drawings it is not limited to such details since many changes and modifications recognizable to those of ordinary skill in the art may be made to the invention without departing from the spirit and the scope thereof. Other objects and advantages of the present invention will be apparent from the following detailed description of the presently preferred embodiments thereof, which description should be considered in conjunction with the accompanying drawings in which:

FIG. 8 is a diagram showing the communication sequence 1;

FIG. 9 is a diagram showing a terminal unit control flowchart 1;

FIG. 10 is a diagram showing a repeater control flowchart 1;

FIG. 11 is a diagram showing the communication sequence 2;

FIG. 14 is a diagram showing a format of user identification information table;

FIG. 15 is a diagram showing a format of apparatus identification information table;

FIG. 16 is a diagram showing a format of user access control table;

FIG. 17 is a diagram showing a format of section access control table;

FIG. 26 is a diagram showing a format of table storing application logs.

DETAILED DESCRIPTION OF PREFERRED EMBODIMENTS

Preferred embodiments of the present invention will be explained below.

The network system as an object in this embodiment has following characteristics.

(a) For distribution of data packet among communication apparatuses, distribution functions such as TCP (Transmission Control Protocol)/IP (Internet Protocol), OSI (Open Systems Interconnection), etc. are used.

(b) For data transfer, a repeater having access control function is provided.

Next, the structure of this network system will be explained with reference to FIG. 3 to FIG. 6.

Figure 1:
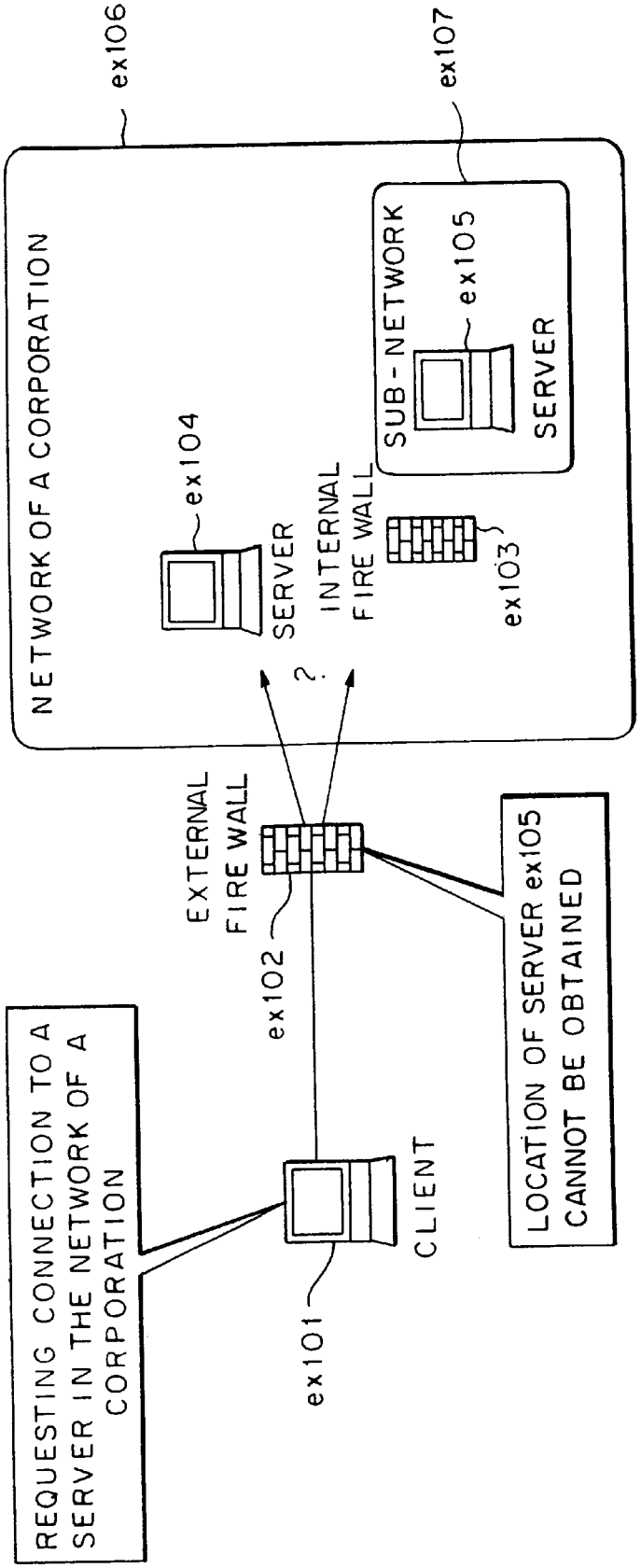
FIG. 1 is a diagram (No. 1) for explaining problems of the related art.
Figure 2:
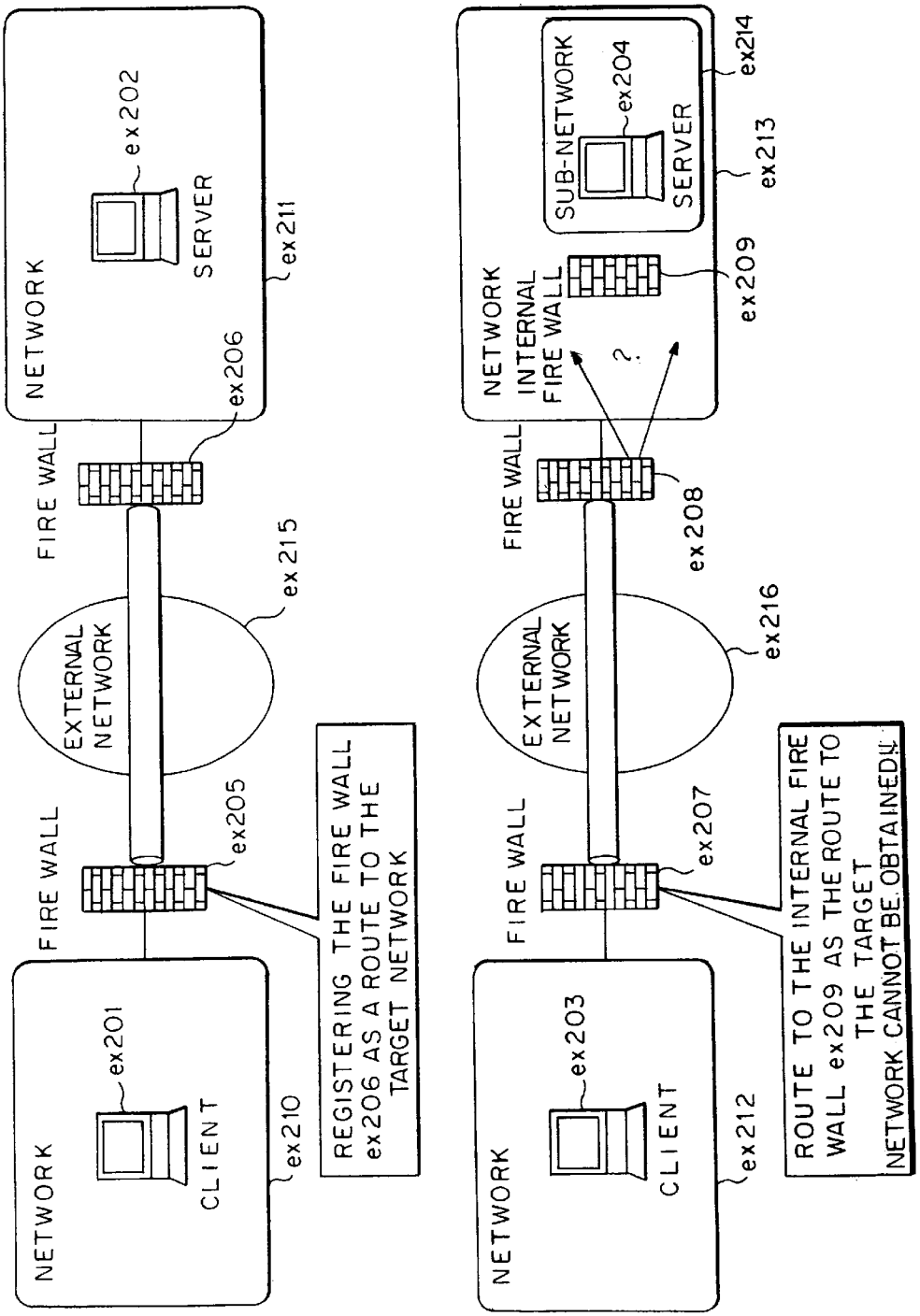
FIG. 2 is a diagram (No. 2) for explaining problems of the related art.
Figure 3:
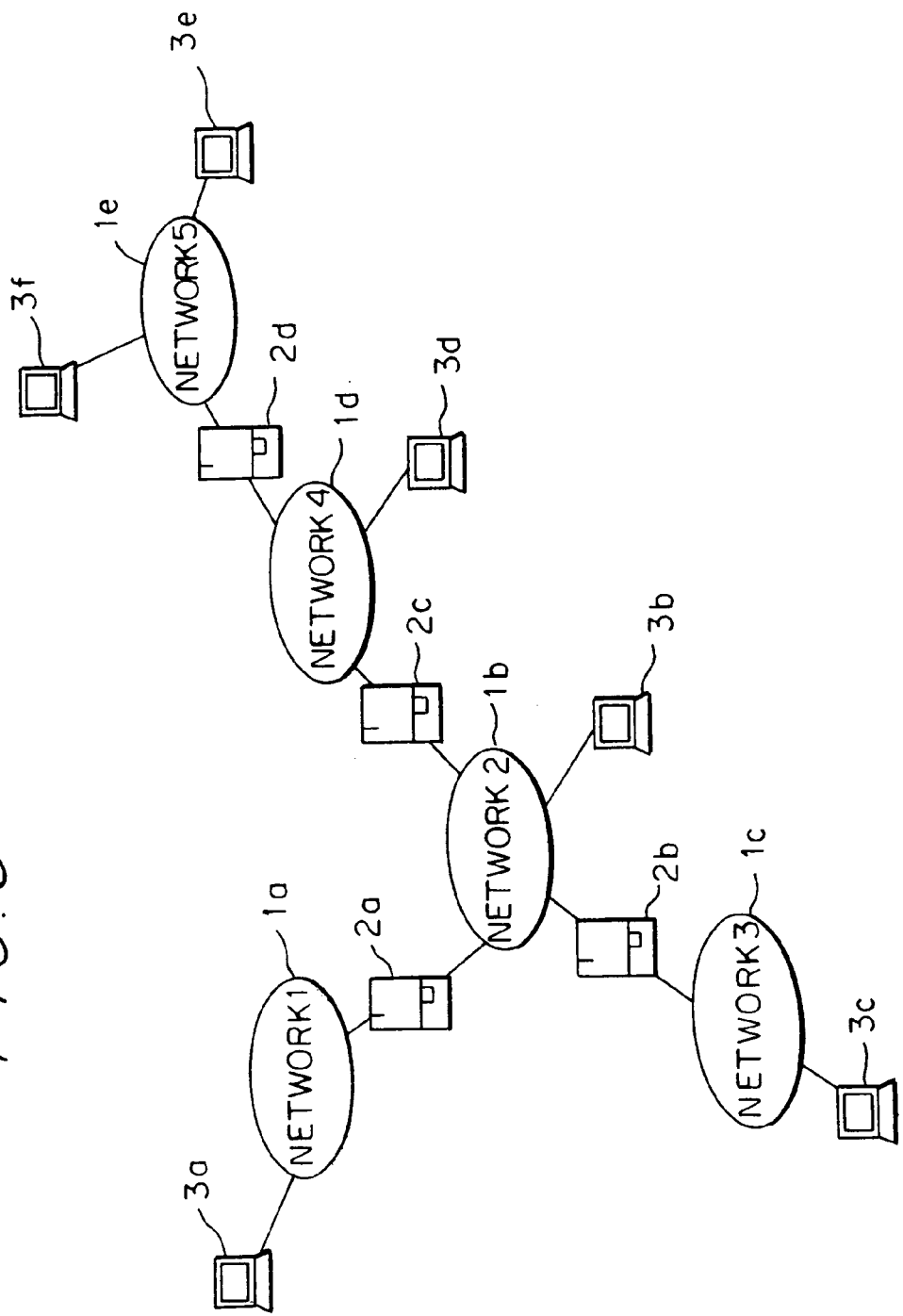
FIG. 3 is a diagram showing a structure of the network system as a whole.

FIG. 3 shows an example of the structure of this network system.

The network system of the present invention has structure that a plurality of networks 1 accommodating terminal units 3 are connected via repeaters (fire wall) 2. In this system, the repeaters 2a to 2d are capable of processing the TCP/IP, OSI protocol, etc., has distribution function of OSI data packet and is also provided with the access control function. In the explanation of this embodiment, the repeater is described as a fire wall. The terminal units 3a to 3f are computers installed in each user site. The networks 1a to 1e mean the networks such as the LAN (Local Area Network) and private line, etc.

Figure 4:
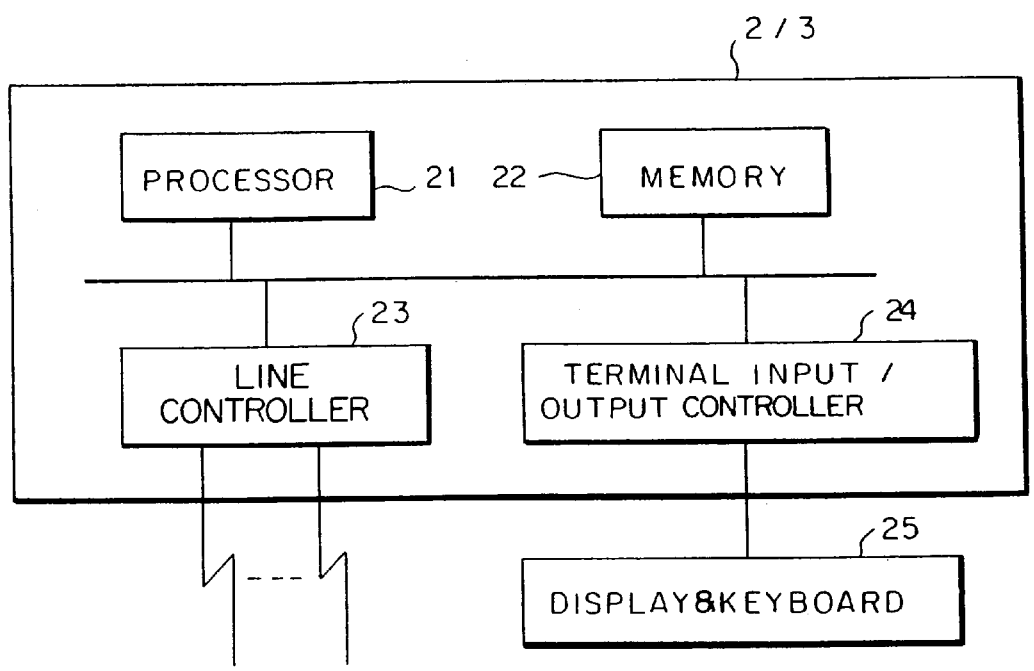
FIG. 4 is a hardware block diagram.

FIG. 4 shows the structure of repeater 2 as an example of the hardware structure of the repeater 2 and the terminal unit 3 of a user site. The repeater 2 includes a processor 21 for controlling hardwares, a memory 22 for storing programs and transmitting/receiving messages, a line controller 23 for controlling input and output of signals to/from LAN and private line and a terminal input/output controller 24 for controlling a display and a keyboard connected to the apparatus. The repeater 2 is connected with a display and keyboard 25 as input/output devices.

Figure 5:
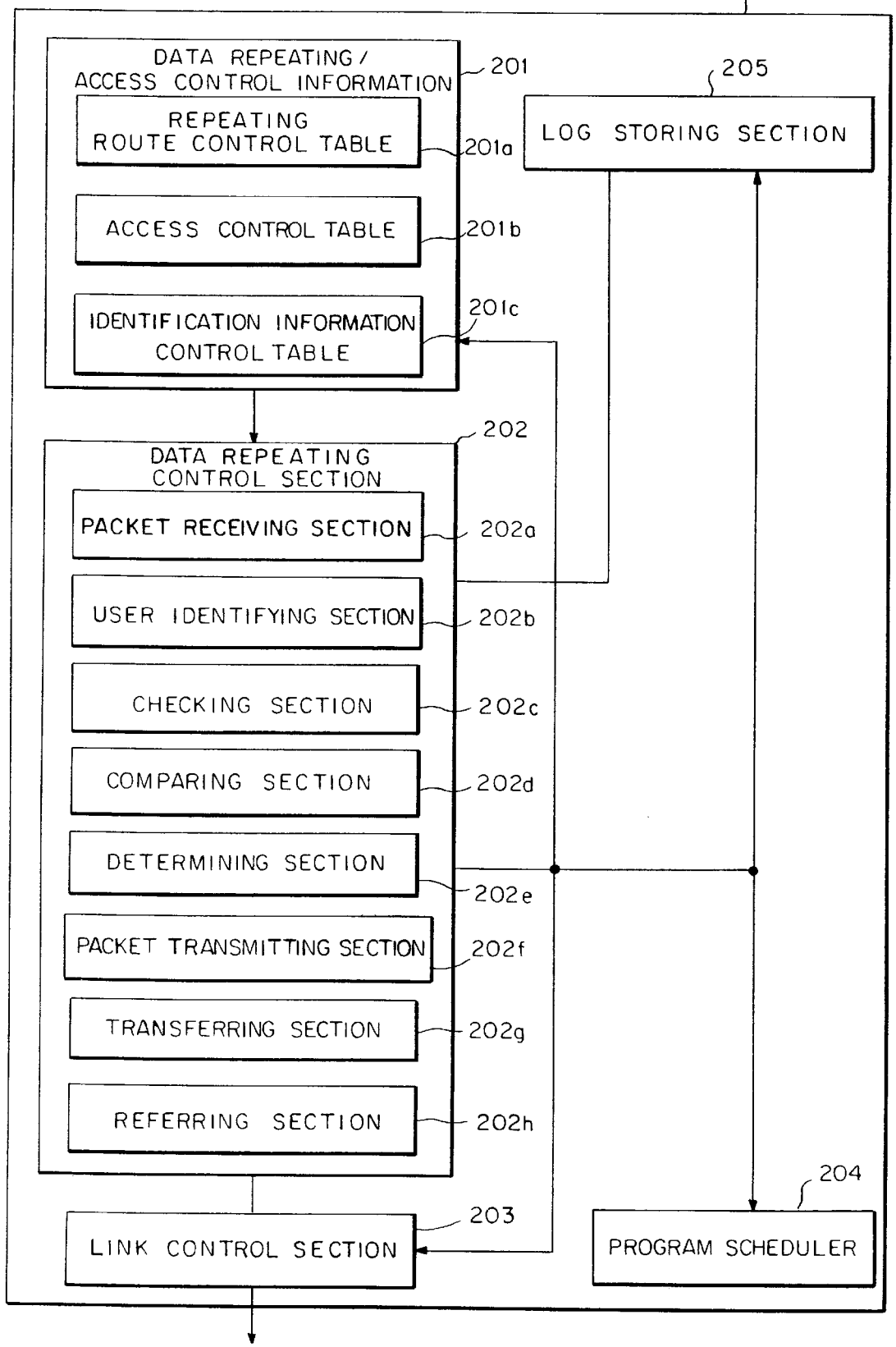
FIG. 5 is a diagram showing a software structure of a repeater.

FIG. 5 shows the software structure of the repeater 2 formed depending on the hardware structure shown in FIG. 4.

The software of the repeater 2 includes a storing section 201 for storing the repeating control information and access control information for transferring and filtering data packet, a data repeating control section 202 for offering the function to transfer the data packet to the target terminal unit depending on the repeating control information and the filtering function to discard of the data packet, a link control section 203 provided in a line control section 23 and a terminal input and output control section 24 to work as an external interface control section to control input and output of the LAN and private line and the terminal unit, a program scheduler 204 for scheduling and administrating program execution of the storing section 201, the data repeating control section 202 and the link control section 203 and a log storing section 205 for storing user application log.

The above functions of the software of the repeater 2 is realized by the processing performed by the processor 21.

In addition, the software executed by the processor 21 is stored in the memory 22, for example.

The program may also be retrieved from a storage medium such as floppy, ROM, etc or from a storage of a server connected to a network which is connected to the repeater, and stored in the memory 22.

In the repeating control information being stored in the storing section 201, a destination address information of the terminal unit (position of terminal unit, terminal unit name, etc.) and a next transmitting address information for sending data to the destination address are registered. Moreover, in the access control information, a user name, various attributes of user (department, official position, available services and accessible range, etc.) are registered.

Figure 6:
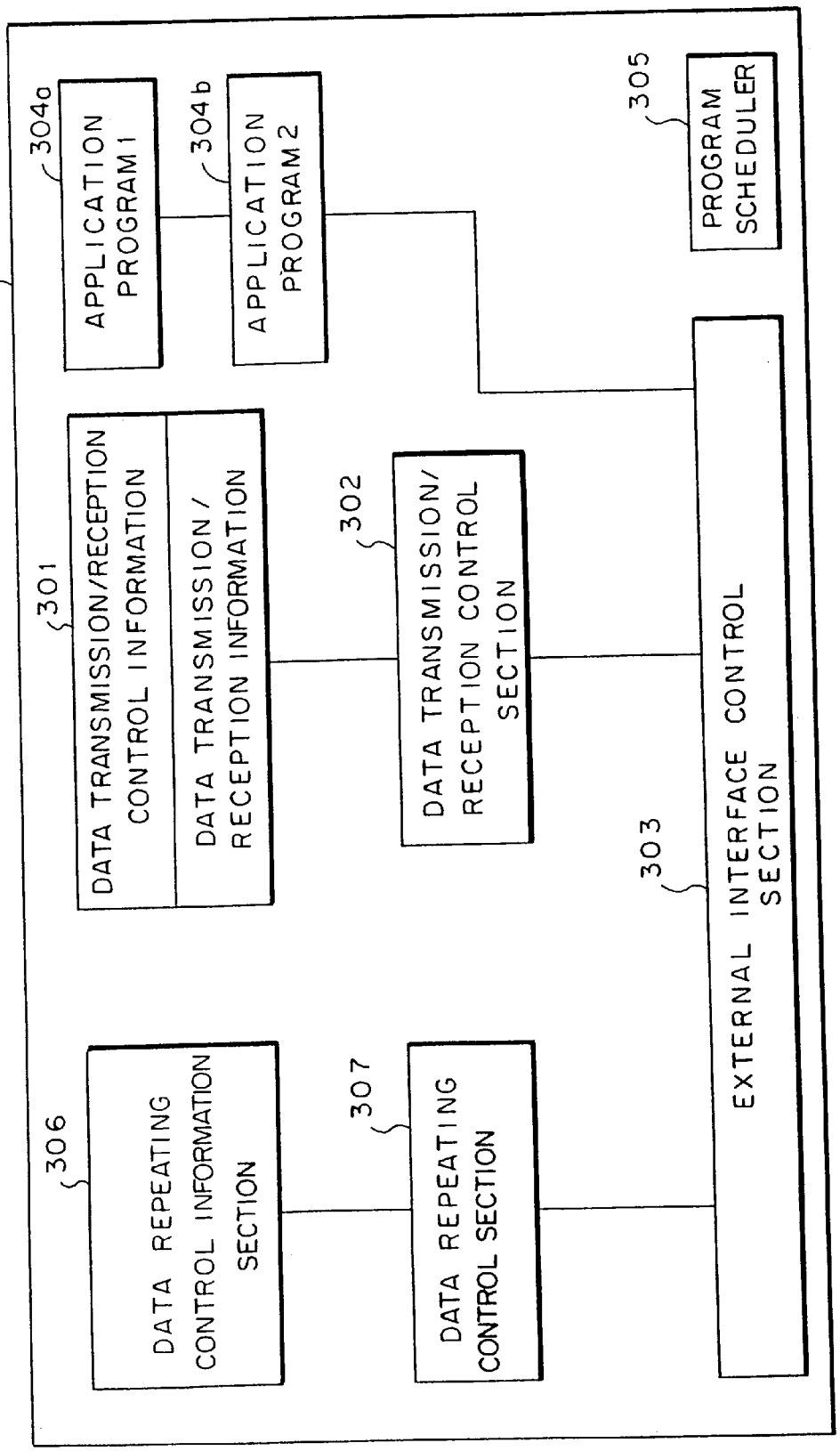
FIG. 6 is a diagram showing a software structure of a terminal unit.

FIG. 6 shows the software structure of a terminal unit 3 formed depending on the hardware structure shown in FIG. 4.

The software of the terminal unit 3 includes a storing section 301 for storing data transmitting and receiving control information as the route information for transmitting and receiving data packet and data transmission and reception information, a data transmission and reception control section 302 for controlling transmission and reception of data packet to and from the target terminal unit depending on this route information, an external interface control section 303 provided in a line control section 23 and a terminal input and output control section 24 to control the input and output of the LAN and private line and terminal unit, a plurality of application programs 304a to 304b operating on the terminal unit 3, a program scheduler 305 for scheduling and administrating program execution of the storing section 301, data transmission and reception control section 302, external interface control section 303 and application programs 304, a data repeating control information section 306 to determine the transmitting destination of the data packet stored in the storing section 306 and a data repeating control section 307 for offering the function to transmit the data packet to the target repeater depending on the data repeating control information.

The above functions of the software of the terminal unit 3 is realized by the processing performed by the processor 21.

In addition, the software executed by the processor 21 is stored in the memory 22, for example.

The program may also be retrieved from a storage medium such as floppy, ROM, etc or from a storage of a server connected to a network which is connected to the terminal unit, and stored in the memory 22.

Next, the packet format and outline of the transmission procedures are explained with reference to FIG. 7 to FIG. 12.

Figure 7A:
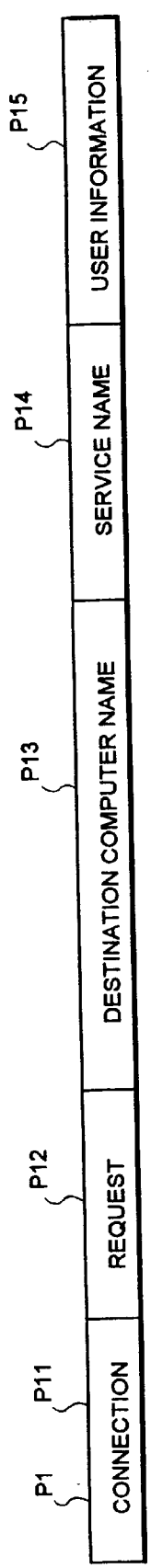
FIG. 7 is a diagram showing a packet format.
Figure 7B:
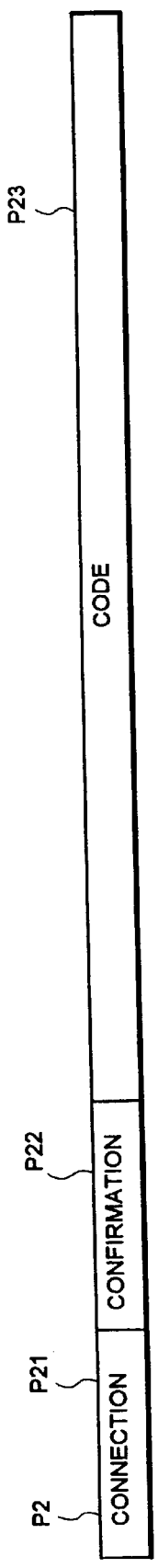
Figure 7C:

FIG. 7 shows an example of the packet format used in this embodiment. FIG. 7(A) shows a format of the connection request packet P1 for requesting start of communication, while FIG. 7(B) shows a format of the connection confirming packet P2 and FIG. 7(C) shows a format of the data transfer packet P3.

Each packet is writing a class of packet in the first field, an operating method in the second field and data in the third and subsequent fields. In the case of the connection request packet P1 for requesting start of communication, "CONNECT" is set to the first field P11, "req" is set in the second field P12 indicating the operating method. In regard to the third field P13 and subsequent fields for transferring data, "transmitting destination terminal unit name" is set in the third field P13, "service name" in the fourth field P14 and "user information" to the fifth field P15. In the user information field P15, the user identification information and transmitting side terminal unit name are stored.

In the connection confirming packet P2 indicating the response for start of communication, "CONNECT" is set to the first field P21, "conf" to the second field P22 and "code" to the third field P23. In the code third field P23, the codes indicating "allowing connection setup", "user identification error", "out of accessible range", etc. and information including names of repeater which has generated such codes and transmitting destination terminal unit are stored as the information indicating the condition of the communication starting operation.

In the data packet P3 used under the communicating condition, "DATA" is set to the first field P31, "null" to the second field P32 and "data" to the third field P33.

FIG. 8 shows the sequence of communication procedures by making access to the terminal unit 3e from the terminal unit 3b in the system shown in FIG. 3.

In this embodiment, prior to start of communication with the target terminal unit, the communication route is established using a packet for declaring start of communication. The connection request packet P1 is the packet for declaring start of communication. The terminal unit 3b transmits, prior to start of communication, the connection request packet P1 having designated the terminal unit 3e as the destination address of the target terminal unit in the third field P13 to the repeater 2c (S1).

In the repeater 2c, a user is identified depending on the user identification stored in the user information field P15 of the connection request packet P1 and thereafter it is judged whether a user is capable of using the repeater 2c or not (S2). When a user is judged to be capable of using the repeater, the connection request packet P1 received is transferred to the next repeater 2d in order to transmit the connection request packet P1 to the target terminal unit (S3). In the repeater 2d, when a user is also judged to use the repeater (S4) in the same manner as those for the repeater 2c, the connection request packet P1 is transmitted to the target terminal unit (S5).

In the terminal unit 3e, after a user is identified (S6), the connection confirming packet P2 having set the normal code "allowing connection setup" in the code field P23 is transmitted to the terminal unit 3b in the transmitting side as the response to the connection request packet P1 (S7). Thereby, the communication route is established between the terminal unit 3b and the terminal unit 3e and data communication may be started to transfer the data packet P3 (S8).

FIG. 9 shows a control flowchart for executing the communication start processing prior to start of communication by the terminal unit 3b with the target terminal unit. The connection request packet P1 designating the target terminal unit 3e in the destination terminal unit name field P13 is transmitted to the repeater 2c (S10). Upon reception of the connection confirming packet P2 as the communication route setup response packet, reference is made to the code field P23 of the connection confirming packet P2 (S11). When the code field P23 is normal, data transfer is started (S12) but if the code field P23 is irregular, communication is completed (S13).

FIG. 10 shows a control flowchart for executing communication start processing by the repeater 2c with terminal units.

When a packet receiving section 202a, included in the data repeating control section 202, receives the connection request packet P1 having designated the target terminal unit 3e as the destination (S21), user identifying section 202b, included in the data repeating control section 202, refers to the user information field P15 stored in the connection request packet P1 to identify a user (S22). When irregularity is not detected as the result of user identification, accessible range of user and matching between terminal units in the transmitting and receiving sides are checked by a checking section 202c, included in the data repeating control 202, that checks range and matching according to a user attribute table in the data repeating control information/access control information 201. The checking section 202c controls access to the terminal or service. The table stores correspondence between at least one attribute of at least one user and accessible range of networks. (S23). When the accessible range is satisfied, the destination terminal unit name field P13 of the connection request packet P1 is compared with the self terminal unit name as the repeating operation by a comparing section 202d included in the data repeating control section 202 (S24). Since the repeater 2c is operating as a repeater and content of the destination terminal unit name field P13 does not match the self terminal unit name, a determining section 202e, included in the data repeating control section 202, determines the next repeating unit name with reference to a repeating route control table 201a in the data repeating control information/access control information 201 (S25). Next, a packet transmitting section 202f included in the data repeating control section 202 transmits the connection request packet P1 (S26). When the connection confirming packet P2 is received as the response of the connection request packet P1, the connection confirming packet P2 received is transferred to the terminal unit 3b which transmitted the connection request packet P1 by a transferring section 202g included in the data repeating control section 202 (S27). Moreover, reference is made to the code field P23 of the connection confirming packet P2 by a referring section 202h included in the data repeating control section 202 (S28). When the code field P23 is normal, data transfer is started (S29), but if the code field P23 is irregular, communication is completed (S31). If irregularity is detected as the result of user identification at step S22, the connection confirming packet P2 setting the error code "irregular user identification" in the code field P23 is transmitted to the terminal unit 3b which has transmitted the connection request packet P1 by the transmitting section 202f (S30) and the communication is completed (S31).

When output of accessible range is judged at step S23, the connection confirming packet P2 setting the error code "out of accessible range" in the code field P23 is transmitted to the terminal unit 3b which has transmitted the connection request packet P1 (S30) and communication is completed (S31).

This control flowchart includes the operations in the destination terminal unit. When the destination terminal unit name field P13 matches with the self terminal unit name at step S24, the self terminal unit is judged as the destination terminal unit in this control flowchart and the connection confirming packet P2 setting the normal code "allowing connection setup" in the code field P23 is transferred to the terminal unit 3b which has transmitted the connection request packet P1 (S32) to start the data transfer (S29).

FIG. 11 shows a modification example of the other embodiment of the communication procedure sequence for making access to the terminal unit 3e from the terminal unit 3b. In the example of sequence shown in FIG. 9, the connection request packet P1 is sequentially transferred by the repeaters, the repeaters must be in the reliable condition with each other. Meanwhile, the example of sequence in this embodiment indicates that the repeaters are not in the reliable condition with each other.

First, prior to start of communication with the target terminal unit, a communication route is established using the packet for declaring start of communication. The connection request packet P1 is the packet for declaring start of communication. A terminal unit 3b transmits, prior to start of communication, the connection request packet P1 designating the target terminal unit 3e as the destination to the repeater 2c (S40). In the repeater 2c, after user identification is performed depending on user identification stored in the user information field P15 of the connection request packet P1, a user is judged to be capable of using the repeater 2c or not (S41). When a user is judged to be capable of using the repeater, the connection confirming packet P2 is transmitted to the terminal unit 3b in the transmitting side (S42).

Upon reception of the connection confirming packet P2 from the repeater 2c, the terminal unit 3b transmits again the connection request packet P1 designating the target terminal unit 3e as the destination to the repeater 2c. The repeater 2c transfers in turn this connection request packet P1 to the repeater 2d (S43).

In the repeater 2d, when a user is judged to be capable of using the repeater 2d in the similar procedures as those for the repeater 2c (S44), the connection confirming packet P2 is transmitted to the terminal unit 3b of the transmitting side (S45).

The terminal unit 3b in the transmitting side transmits, upon reception of the connection confirming packet P2, the connection request packet P1 designating the target terminal unit as the destination to the repeater 2c. The repeaters 2c and 2d transfer this packet P1 to the target terminal unit 3e (S46).

The destination terminal unit 3e identifies a user depending on user identification stored in the user information field P15 of the connection request packet P1 (S47) and transmits the connection confirming packet P2 to the terminal unit 3b in the transmitting side as a response to the connection request packet P1 (S48). Thereby, the communication route can be set up between the terminal unit 3b in the transmitting side and the destination terminal unit 3e, data communication can be started and data packet P3 can be transmitted (S49). With execution of repeated communication route setup request, user identification for the terminal unit 3b in the transmitting side is performed for each repeater and services of this invention can also be offered even when reliable condition is not yet established among the repeaters.

Figure 12:
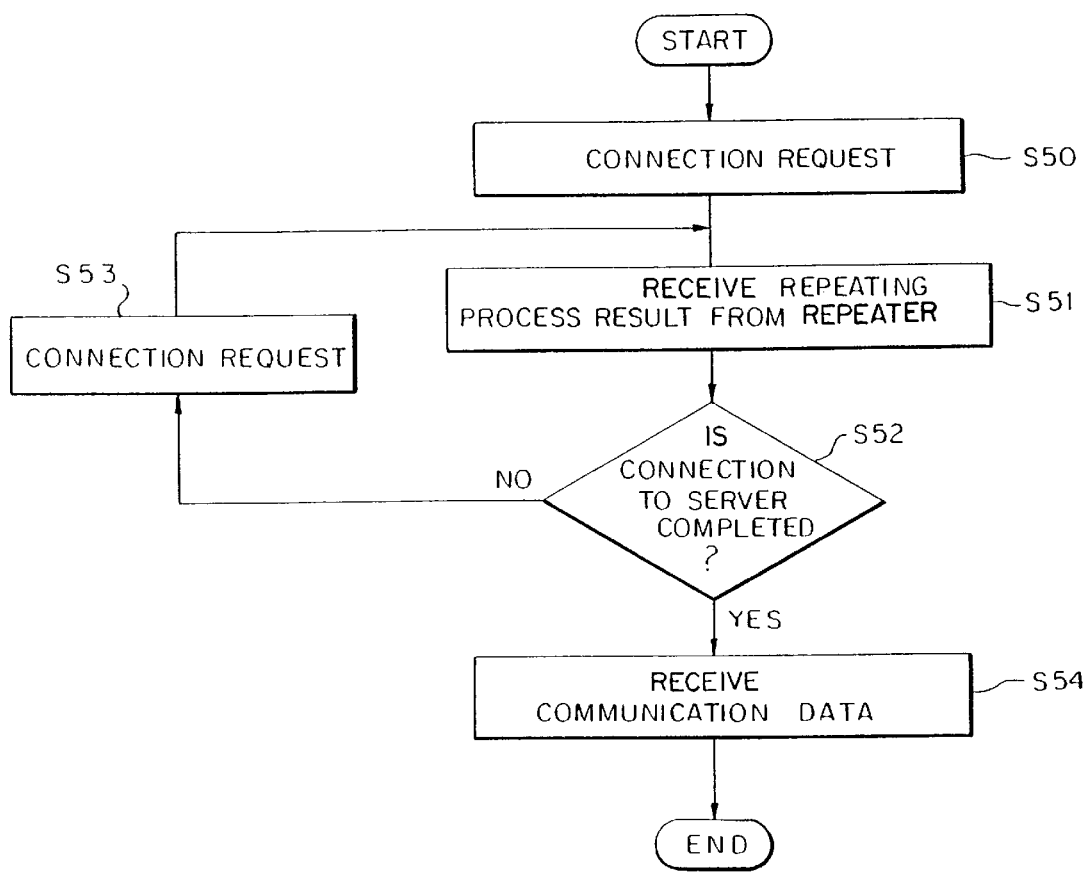
FIG. 12 is a diagram showing a terminal unit control flowchart 2.

FIG. 12 shows a control flowchart for executing the communication start processing prior to start of communication by the terminal unit 3b with the target terminal unit 3e. The connection request packet P1 designating the target terminal unit as the destination in the destination terminal unit name field P13 is transmitted to the repeater 2c (S50). Thereby, when the connection control packet P2 which is the communication route setup response packet is received in turn, whether connection to the target terminal unit 3e is completed or not is judged (S52) by referring to the code field P23 of the connection confirming packet P2. When the packet P2 is issued to confirm the connection from the repeater, the connection request packet P1 is transmitted again to the repeater 2c (S53) and operation returns to the step S51. When the packet P2 is issued to confirm the connection from the terminal unit 3e, data transfer is started (S54).

Figure 13:
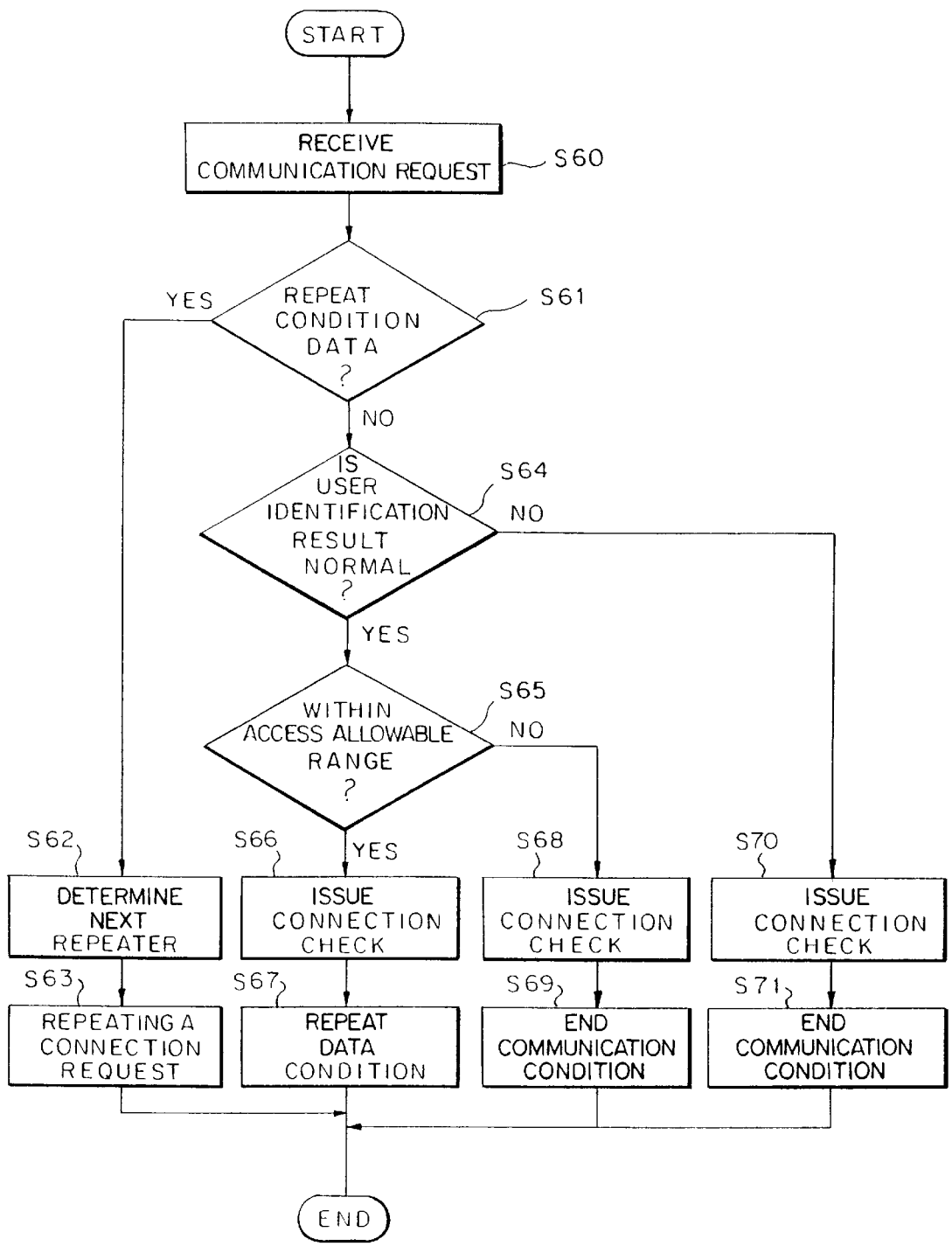
FIG. 13 is a diagram showing a repeater control flowchart 2.

FIG. 13 shows a control flowchart for executing communication start process by the repeater 2c with a terminal unit depending on the sequence shown in FIG. 11. The repeater 2c starts, upon reception of the connecting request packet P1 (S60) designating the target terminal unit 3e as the destination, the data repeating condition checking process (S61). The connection request P1 is the first request received by the repeater 2c and the data repeating condition is in the initial condition. Therefore, user identification process is started (S64) by referring to the user information field P15 stored in the connection request packet.

When irregularity is not detected as the result of user identification, the allowable accessible range of user and matching between the terminal unit in the transmitting side and destination terminal unit is checked (S65). When the allowable accessible range is satisfied, the connection confirming packet P2 setting the normal code "repeating of connection is possible" in the code field is transferred to the transmitting side terminal unit 3b (S66) to start the data transfer condition (S67).

Next, when the connection request packet P1 is received (S60), since the data transfer operation (data repeating) is performed at step S61 for checking the condition, the connection request packet P1 is judged to be received and the repeater is determined (S62) to transfer the connection request packet P1 (S63) by referring to the repeating route control table. At step S64, if irregularity is detected as the result of user identification, the connection confirming packet P2 setting the error code "irregularity of user identification" in the code field P23 is transmitted to the terminal unit 3b which has transmitted the connection request packet P1 (S70) to complete the communication (S71).

At step S65, when the request is out of the accessible range, the connection confirming packet P2 setting the error code "out of the accessible range" in the code field P23 is transmitted to the terminal unit 3b which has transmitted the connection request packet P1 (S68) to complete the communication (S69).

Next, outline of user identification performed in the communication procedures will be explained with reference to FIG. 14 and FIG. 15. In this embodiment, a password identification method will be explained. Various identification methods such as the identification mechanism using a public key and individual identification mechanism have been proposed and this embodiment can be applied to any type of identification mechanism.

FIG. 14 shows a table storing an identification information for utilizing each repeater held by a user 1. The user-held identification information table 400 is constituted by a repeater name 401 in which the repeater name is described and an identification information 402 in which a password information required for identification in each repeater is described. In this example, a user (user 1) is capable of using only the repeater 2a and it has a password "test". When a user (user 1) makes communication via the repeater 2a, it is requested to set this identification information in the user information field P15 of the connection request packet P1.

FIG. 15 shows a table 410 storing the user identification information held by the repeater 2a. In the repeater-held identification information table 410, a user name 411 and a password information 412 of each user are described. In this example, the password of user (user 1) is set to "test", password of user (user 2) to "abcdx", the password of user (user 3) to "poisd" and the password of user (user 4) to "odksci". In this case, if the identification information described in the table is stored in the user information field P15 of the connection request packet P1 when an user 1 to 4 attempts communication via the repeater 2a, such user is identified as the user himself (S22, S64) and the next access control is started (S23, S65).

Next, outline of the access control, to be executed in a company organization as an example, in the communication sequence will be explained with reference to FIG. 16 to FIG. 20.

FIG. 16 shows a table 420 storing user access control information, which are user attributes, held by the repeater 2a. In the user access control table 420 held by the repeater, user name 421 of each user, department 422 to which user belongs, official position of user 423, transmitting side network 424 to which a user can make access, destination network 425 to which a user can make access and services 426 which a user can receive are respectively described.

In this example, a user (user 1) can make access to the network 1a or network 1b from the network 1a or network 1b and the service which a user (user 1) can receive is only the file transfer. A user (user 2) can make access to the network 1c or network 1e from the network 1c or network 1e and a user (user 2) can receive any kinds of services because "*" is indicated in the service column 426. A user (user 3) can make access to any network from any network because "*" is indicated in the transmitting side column 424 and destination column 425 and can receive the virtual terminal service. A user (user 4) can make access to any network from any network and can receive any services because "*" is indicated in the transmitting side column 424, destination column 425 and service column 426. The asterisk mark "*" indicated in the table means the accessible networks and receivable services. The sign "-" means that the item given this mark is not available. As explained above, the regions on the network which a user can use are defined in the transmitting side column 424, destination column 425 and service column 426.

FIG. 17 shows a table 430 storing an access control information of department, which are also user attributes, held in the repeater 2a. The access control table 430 of department held in the repeater describes, for each department, department name 431, accessible destination network 432, accessible transmitting side network 433 and available service 434. In this example, the department "Planning" is capable of making access to the networks 1b, 1c, 1d and 1e from the networks 1b or 1d and can receive only the virtual terminal service. Namely, the regions on the network which each department can use are defined in the destination column 432, transmitting side column 433 and service column 434. As explained, the regions on the network can be defined not only for users but also for one attribute. The asterisk mark "*" described in the table means the accessible network and receivable services. The sign "-" means that the item given this mark is not available.

Figure 18:
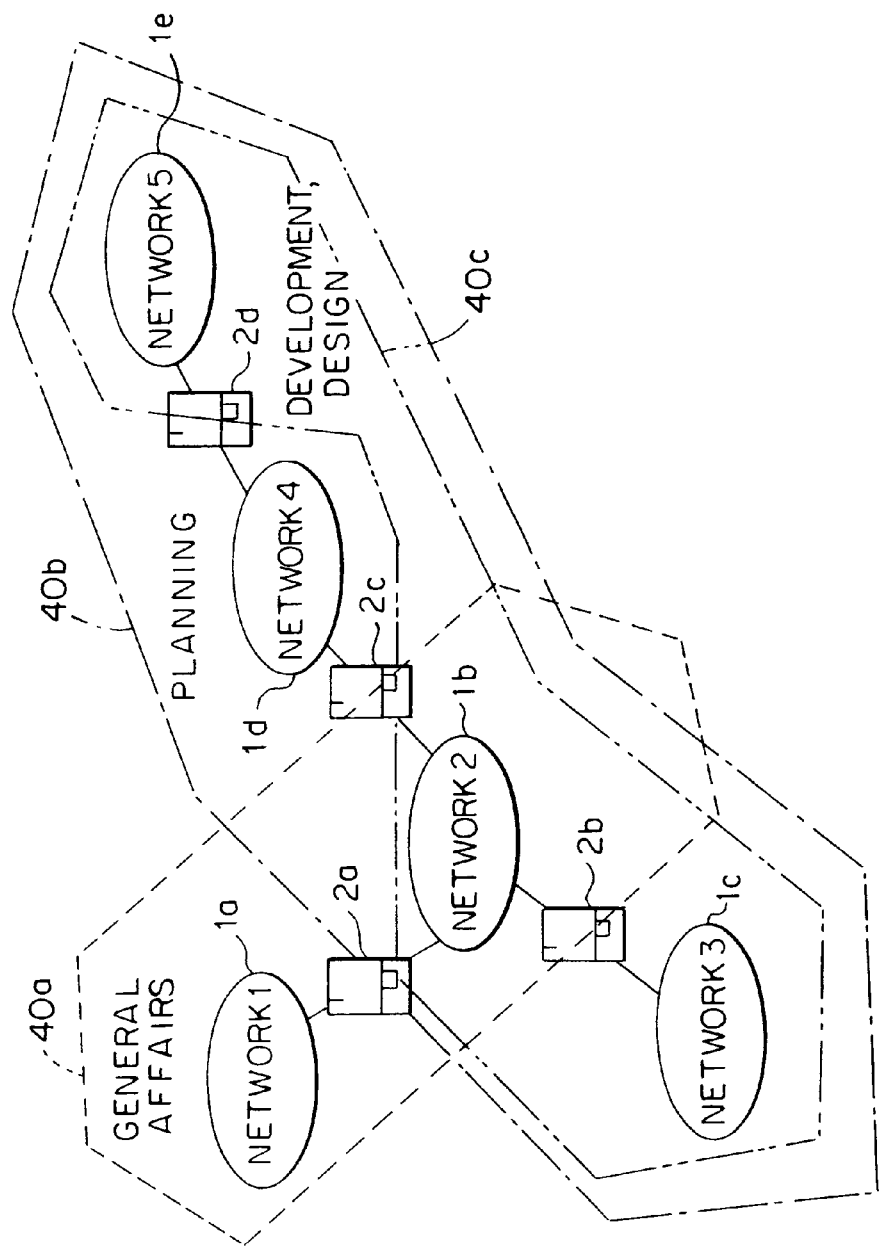
FIG. 18 is a diagram showing an example of accessible region.

FIG. 18 shows the accessible regions which can be formed depending on the access control information of department. This figure shows the accessible regions of department defined by each table explained above. The accessible region 40a of the Department of General Affairs is the network 1a and network 1b, while the accessible region 40c of the Department of Development and Design is the network 1b, network 1c and network 1e, and the accessible region 40b of the Department of Planning is the network 1b, network 1c, network 1d and network 1e.

As explained above, in this embodiment, the accessible terminal units and application region such as network can be defined for each user depending on the various attributes held by user and moreover the accessible region can also be defined for attribute. As explained, the application regions constituted on the network can form the logical networks for each user, each department and each official position.

Figure 19:
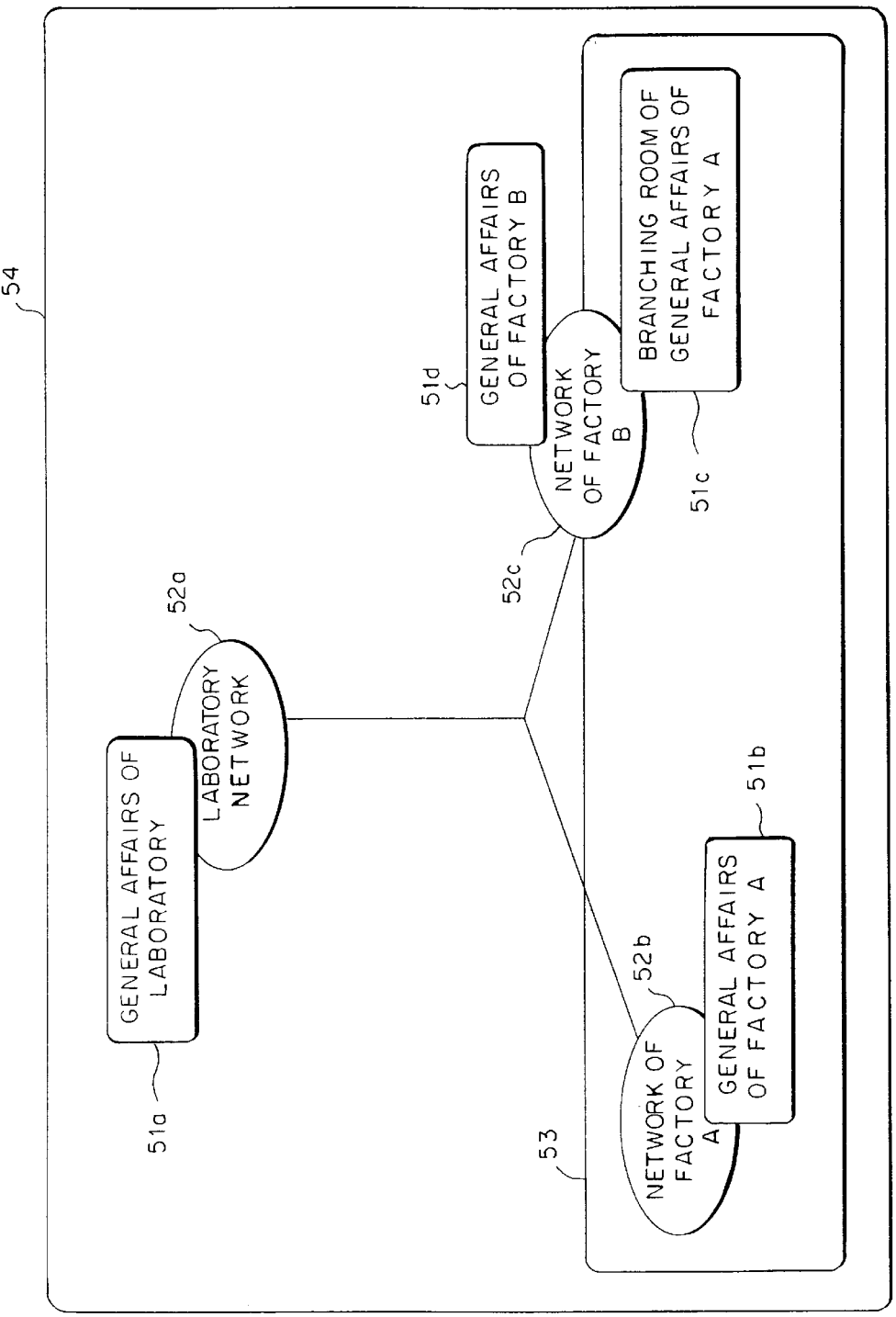
FIG. 19 is a diagram showing an example of a hierarchical network structure.

FIG. 19 shows the accessible regions when structure of the departments are hierarchically indicated. In this example, the Department of General Affairs 51b of factory A connected to the network 52b of factory A and the Department of General Affairs 51c of factory A connected to the network 52c of factory B can form the accessible region 53 which enables the same work, namely the logical network by defining the Department of General Affairs of factory A as a user or an attribute value of department. The Department of General Affairs 51d of factory B connected to the network 52c of factory B and the Department of General Affairs 51a of laboratory connected to the laboratory network 52a can form, by limiting the services, the region having the properties different from that of the available region 53, namely the available region 54, that is, the logical network which can perform the same work in the Department of General Affairs 51b, 51c of factory A, the Department of General Affairs 51*d* of factory B and the Department of General Affairs 51*a* of laboratory because the service used for mutual information exchange between the Department of General Affairs 51*b*, 51*c* of factory A is fixed to the particular services.

By forming individual networks in different attribute values and properties, the network satisfying individual access policy and security policy can be constituted while offering the transparent network environment.

Figures 20, 21:
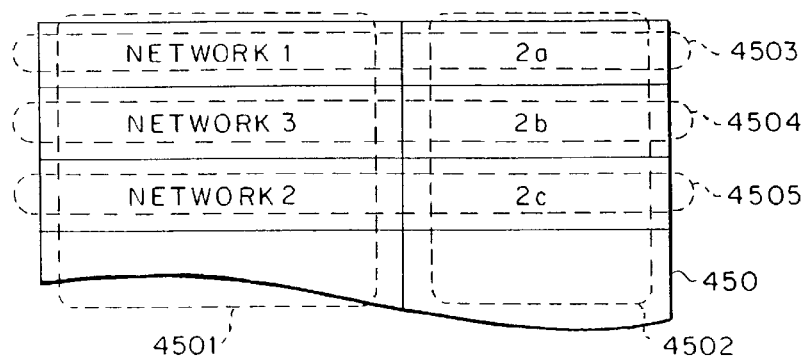
FIG. 20 is a diagram showing a format of official position access control table.
FIG. 21 is a diagram showing a format of repeating path information table.

FIG. 20 shows a table 440 storing access control information of official position, which are also user attributes, held in the repeater 2*a*. The access control table 440 of official position held in the repeater describes, for each official position name 441, class of transmitting and destination networks 442 indicating the accessible network range, remote destination 443 indicating the accessible destination network and available services 444. The class of transmitting and destination networks 442 indicates the accessible network range. Description "local" indicates that only the network connected to the terminal unit in the transmitting side may be used, while "remote" indicates that the networks other than that connected to the terminal unit in the transmitting side can also be used. The remote destination 443 is effective only when "remote" is set in the transmitting and destination networks 442 and indicates the accessible destination network. In this example, the official position "General Manager" can make access to the network connected to the terminal unit of the transmitting side and to the network other than that connected to the terminal unit in the transmitting side and can make access to any network and receives all services. The asterisk mark "*" described in the table means access to any network is possible and any service can be received. The sign "-" means that the item given this mark is not available.

Relationship between the user access control table 420, department access control table 430 and position access control table 440 will be explained. A user (user 1) belongs to the Department of General Affairs and has the official position "General Manager". A user (user 1) can make access to the network 1*a* and network 1*b* and receive the service of only file transfer from the item 427*a* of user (user 1) in the user access control table 420. Next, from the item 431 of the Department of General Affairs in the department access control table 430, a user (user 1) can make access to the network 1*a*, network 1*b* and receive the service of only database access. Moreover, from the item 445*a* of position "General Manager" in the position access control table 440, the local and remote networks can be used and there is no limitation on the available services.

The access control mechanism solves mismatching of these access control with any one of a rule of logical sum, a rule of logical product and a rule of attribute priority. For instance, in the case of the rule of logical sum, a user (user 1) can make access to the network 1*a*, network 1*b* from the network 1*a*, network 1*b* and can receive the services of file transfer and database access. In the case of the rule of logical sum, the asterisk mark "*" is excluded from the object. In the case of the logical product, a user (user 1) can make access to the network 1*a*, network 1*b* from the network 1*a* and network 1*b* but actually can make access within the network 1*a* and network 1*b* because there is no receivable service. Moreover, in the case of the rule of attribute priority, the network (Net-1) 1*a* and network 1*b* can be used the only the file transfer service can be received by judging the conditions only from user.

A user (user 2) has the official position "Section Chief". In this case, department access control is excluded from the control object. In the case of the rule by logical sum, a user (user 2) can make access to the network 1*c* and network 1*e* from the network 1*c* and network 1*e* and receive only the virtual terminal service. Also, in the case of the logical product, a user (user 2) can make access to the network 1*c* and network 1*e* from the network 1*c* and network 1*e* and receive only the virtual terminal service.

A user (user 3) belongs to the Department of Planning and has the official position "General Manager". In the case of the rule by logical sum, a user (user 3) can make access to the network 1*b*, network 1*c*, network (Net-4) 1*d* and network 1*e* from the network 1*b* and network 1*d* and receive only the virtual terminal service. Also, in the case of the logical product, a user (user 3) can make access to the network 1*b*, network 1*c*, network 1*d* and network (Net-5) 1*e* from the network 1*b*, network 1*d* and can receive only the virtual terminal service.

A user (user 4) belongs to the Department of Planning and does not have any official position. In the case of the rule by logical sum, a user (user 4) can make access to the network 1*b*, network 1*c*, network 1*d* and network 1*e* from the network 1*b* and network 1*d* and can receive only the virtual terminal service. In the case of the rule by logical product, a user (user 4) can make access only in the network 1*b* and network 1*d*.

As explained above, the user in the user attribute table 420, 430 or 440 can be defined as not only an individual but also a section, a group or a position.

Next, outline of the data repeating control executed in the communication procedures will be explained with reference to FIG. 21.

FIG. 21 shows the repeating route control table 450 storing the data repeating route information held in the terminal unit 3*b* in the network 2 and the repeating route control table 451 storing the data repeating route information held in the terminal unit 2*c*. The tables 450, 451 storing the data repeating route information respectively have a network name describing field 4501 for designating the network which requires repeating and a repeater name describing field 4502 for designating a repeater used for repeating to the network.

The network name describing field 4501 can use a negative operator "-" for description of the part other than the network name described. For instance, "-network 2" indicates a "network other than the network 2". In the table 450, a record 4503 indicating "repeating to the network 1 is performed by the repeater 2*a*", a record 4504 indicating "repeating to the network 3 is performed by the repeater 2*b*" and a record 4505 indicating "repeating to the network other than the network 2 is performed by the repeater 2*c*" are registered respectively.

It is also possible to set that repeating to the network 4 and network 5 can be performed by the repeater 2*c* by sequentially evaluating these records from the record registered previously. In the same manner, in the table 451, a record 4511 indicating "repeating to the network 1 is performed by the repeater 2*a*", a record 4512 indicating "repeating to the network 3 is performed by the repeater 2*b*" and a record 4505 indicating "repeating to the network 5 is performed by the repeater 2*c*" are registered. Description of network and repeater in the table can be realized by designation with a domain name and a host name in DNS or by designation with IP address and net mask.

In above embodiment, various attributes of user, access control information and user identification information are defined for each repeater and each apparatus for making communication. Registration and renewal of these pieces of information can be executed for each unit from an administration terminal or by using a control unit for simultaneously controlling the repeaters and terminal units for communication.

Moreover, it is also possible to obtain the information by issuing an inquiry at the time of identifying a user and confirming contents of access control by previously registering various attributes of user, access control information and user identification information to information server, etc. such as directory server.

The basis virtual network system and apparatus of this system are explained above but erroneous connection can be prevented by executing mutual identification of terminal unit and repeater when the connection request (S10, S50) in the terminal unit control flowchart and the connection request (S26) in the repeater control flowchart are issued.

Figure 22:
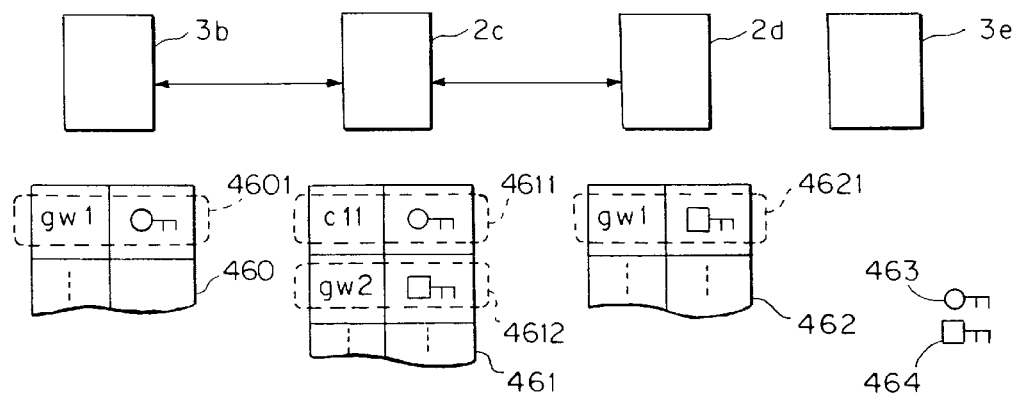
FIG. 22 is a diagram showing a mutual identification method 1.

FIG. 22 shows an example of the mutual identification method in the communication procedure 1. The identification information table 460 of the terminal unit 3b has an entry 4601 including ID of repeater 2c and a common key 463. The identification information table 461 of the repeater 2c has an entry 4611 including ID of terminal unit 3b and a common key 463 and an entry 4612 including ID of repeater 2d and a common key 464. The identification information table 462 of repeater 2d has an entry 4621 including ID of repeater 2c and a common key 464.

Utilization of the ISO/IEC9798, for example, using the common key explained above realizes mutual identification between the terminal unit 3b and repeater 2c and between the repeater 2c and repeater 2d. The communication data between adjacent apparatuses can also be encrypted depending on the information used in common through the identification process.

Figure 23:
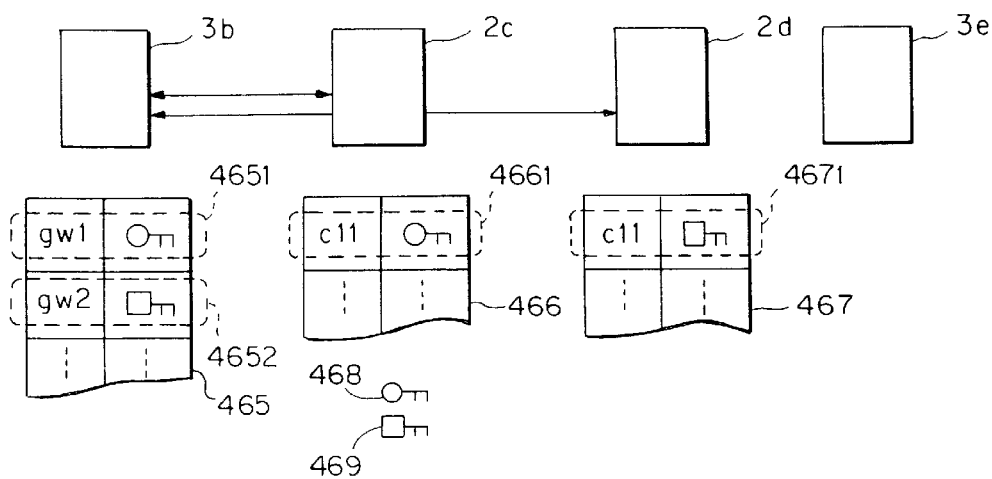
FIG. 23 is a diagram showing a mutual identification method 2.

FIG. 23 shows an example of the mutual identification system in the communication procedure 2. The identification information table 465 of terminal unit 3b has an entry 4651 including ID of repeater 2c and a common key 468 and an entry 4652 including ID of repeater 2d and a common key 469. The identification information table 466 of repeater 2c has an entry 4661 including ID of terminal unit 3b and a common key 468. The identification information table 467 of repeater 2d has an entry 4671 including ID of terminal unit 3b and a common key 468. Utilization of the common key realizes mutual identification between the terminal unit 3b and repeater 2c and mutual identification between the terminal unit 3b and repeater 2d. Moreover, the communication data between the terminal unit 3b and the repeater 2d adjacent to the terminal unit 3e can also be encrypted depending on the information used in common through the identification process.

Figure 24A:
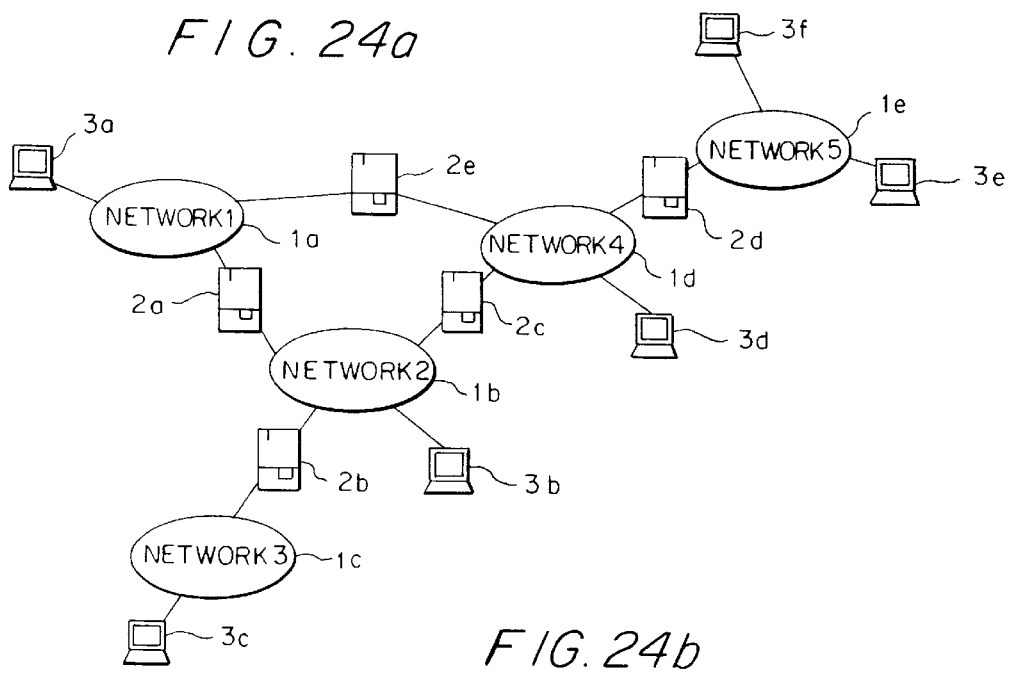
FIG. 24 is a diagram for explaining dynamic path control.
Figure 24B:
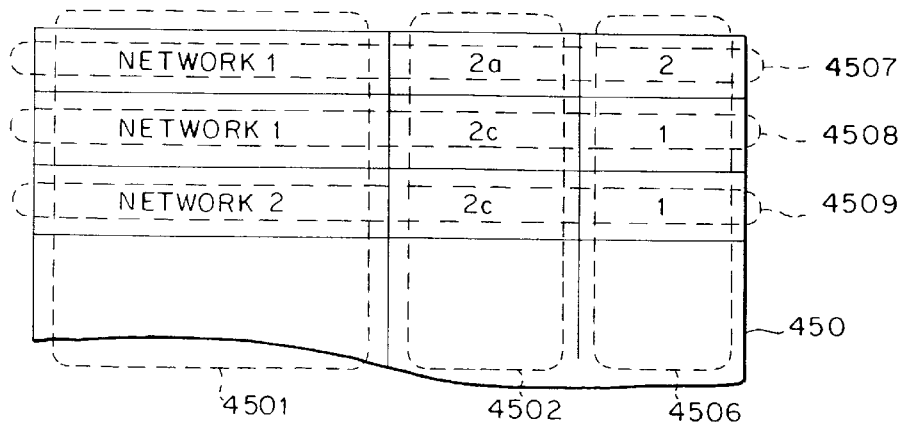

When a plurality of repeaters which enable repeating operation to the network exist as shown in FIG. 24, each repeater transmits, to the other repeater or terminal unit, the information of the network through which each repeater can repeats the data and the repeater or terminal unit can realize dynamic selection of route by writing the information received from the other repeater into the table 450 storing the route information.

Moreover, dynamic route selection based on the priority can also be realized by adding the field 4506 indicating priority to the table 450 storing the route information as explained below.

For example, when communication is made between the terminal unit 3b and the terminal unit 3a, the repeaters 2a, 2c become the candidate repeaters for repeating operation. The repeaters 2a, 2c periodically transmit the numerical value information indicating the loading conditions thereof, the priority field 4506 of records 4507, 4508 in the repeating route information storing table 450 are updated depending on the loading conditions of these repeaters, and the repeaters having higher priority are connected sequentially by referring to the field on the occasion of starting the communication. If connection is rejected, the repeater of the next priority is connected to realize dynamic route selection.

Figure 25:
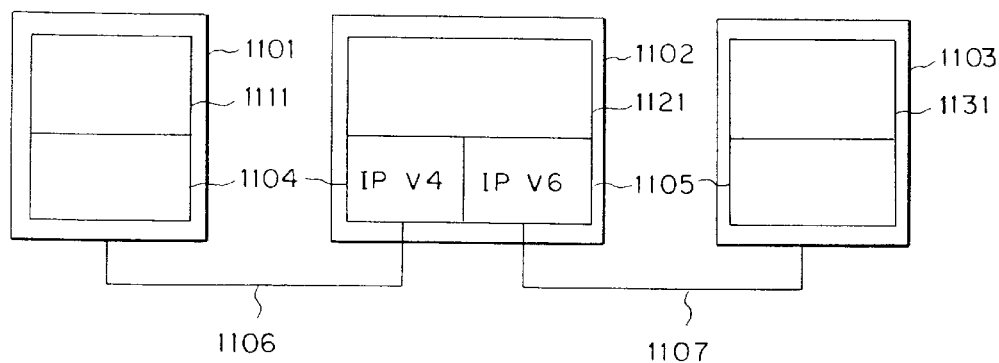
FIG. 25 is a diagram for explaining a protocol conversion function.

FIG. 25 is a diagram for explaining an example of the communication infrastructure converting function in the virtual network structuring method and apparatus of this system. In this figure, 1101 designates a client computer; 1102, a fire wall and repeating server; 1111, a communication client program; 1121, a data repeating control program; 1103, a server computer; 1131, a server program; 1104, a communication module corresponding to IP V4; 1105, a communication module corresponding to IP V6; 1106, an IP V4 network; 1107, an IP V6 network. The client computer 1101 makes communication conforming to IP V4 protocol using the communication module 1104 corresponding to IP V4. Moreover, the server computer 1103 makes communication conforming to IP V6 protocol using the communication module 1105 corresponding to IP V4.

Therefore, the client computer 1101 and server computer 1103 cannot realize the direct communication. However, the communication between these client computer 1101 and server computer 1103 can be realized by utilizing the data repeating control program 1121 in the fire wall and repeating server 1102 having the IP V4 communication module 1104 and IP V6 communication module 1105. In FIG. 25, conversion between IP V4 and IP V6 has been conducted as an example of the communication infrastructure, but the existing communication infrastructure can also be used by utilizing appropriate repeating program and repeating route table.

FIG. 26 shows a table storing user application log obtained in the repeater. In the user application log table 470, a user name 471, a transmitting side terminal unit 472 used, a destination terminal unit 473 used, a service 474 which a user has received, condition 475 indicating start and end of service, accessibility 476 indicating that connection is accepted in the repeater in which log is collected and time 477 indicating start and end of service are described.

As explained previously, the present invention assures the effect of offering a large scale network system for realizing communication having passed a fire wall by providing a means for exchanging the repeating route information between a plurality of fire walls (repeaters) and of offering a network system having higher security and operation flexibility by realizing access control based on computer users and applications.

Although preferred embodiments of the present invention have been described and illustrated, it will be apparent to those skilled in the art that various modifications may be made without departing from the principles of the invention.

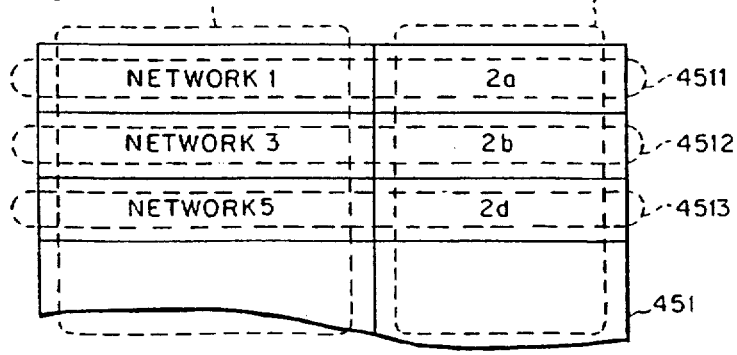

We claim:

1. A repeater for connecting two networks respectively connected to at least one terminal, comprising:

means for receiving a connection request packet designating a destination terminal from a transmission terminal;

means for identifying a user by referring to a user information field stored in said connection request packet;

means for controlling access depending on at least one attribute of said user in said connection request packet, and comprising:

an access control table for storing correspondence between at least one attribute of at least one user and accessible range of said networks; and means for checking said at least one attribute of said user in said connection request packet with said accessible range of said networks according to said access control tablet;

means for transmitting said connection request packet to a next (stage) repeater provided to identify said user by referring to said user information field stored in said connection request packet;

a repeating route control table for storing at least one correspondence between a first address area designated by excluding specified address area and an address of another device provided to transfer the data to said first address area, and for storing correspondence between a second address area including said destination terminal and an address of another repeater provided to transfer the data to said second address area;

means for making a comparison between the destination terminal name field of said connection request packet and said destination terminal according to said repeating route control table; and means for making a determination of the next (stage) repeater with reference to said repeating route control table based on said comparison.

2. The repeater according to claim 1, wherein said means for controlling access executes access control by combining said attributes of said user in said access control table according to a predetermined rule.

3. The repeater according to claim 2, wherein said attribute of said user in said access control table comprises at least one of a user name, an official position and a department.

4. The repeater according to claim 3, further comprising:

means for changing said attribute of said user in said access control table according to information received via said networks.

5. A repeater for connecting two networks each being connected to at least one terminal, said repeater comprising:

a repeating route control table for storing at least one correspondence between a first address area designated by excluding a specified address area and an address of another repeater provided to transfer the data to said first address area, and for storing correspondence between a second address area including said destination terminal and an address of another repeater provided to transfer the data to said second address area;

means for receiving a connection request packet designating a destination terminal from a transmission terminal;

means for making a comparison between the destination terminal name field of said connection request packet and said destination terminal according to said repeating route control table;

means for making a determination of a next (stage) repeater with reference to said repeating route control table based on said comparison; and means for transmitting said connection request packet to said next (stage) repeater based on said determination.

6. The repeater according to claim 5, further comprising:

means for changing contents of said repeating route control table according to information received via at least one of said networks.

7. The repeater according to claim 6, wherein said means for changing changes said contents depending on a load condition, a fault condition or a designation of application running on said at least one terminal.

8. A computer program stored on a storage medium, for repeating a communication, when said computer program is executed by a computer which connects two networks each being connected to at least one terminal, said computer program causes said computer to perform the steps of:

receiving a connection request packet designating a destination terminal of said at least one terminal from a transmission terminal of said at least one terminal;

identifying a user by referring to a user information field stored in said connection request packet;

controlling access depending on at least one attribute of said user in said connection request packet according to an access control table which stores correspondence between at least one attribute of at least one user and accessible range of said networks; and transmitting said connection request packet to a next (stage) repeater provided to identify said user by referring to said user information field stored in said connection request packet.

9. The computer program according to claim 8, wherein said controlling access step includes checking said at least one attribute of said user in said connection request packet with said accessible range of said networks according to said access control table.

10. The computer program according to claim 9, further causing said computer to perform the steps of:

making a comparison between the destination terminal name field of said connection request packet and the repeater name according to a repeating route control table which stores correspondence between an address area including said destination terminal and an address of another repeater provided to transfer the data to said address area; and determining a next (stage) repeater with reference to said repeating route control table based on said comparison.

11. The computer program according to claim 9, wherein said controlling access step further includes combining said attributes of said user in said access control table according to a predetermined rule.

12. The computer program according to claim 11, wherein said attribute of said user in said access control table comprises at least one of a user name, an official position and a department.

13. The computer program according to claim 12, further causing said computer to perform the step of:

changing said attribute of said user in said access control table according to information received via said networks.

14. A computer program stored on a storage medium, for repeating a communication, when said computer program is executed by a computer which connects two networks each being connected to at least one terminal, said computer program causes said computer to perform the steps of:

receiving a connection request packet designating a destination terminal of said at least one terminal from a transmission terminal of said at least one terminal;

making a comparison between the destination terminal name field of said connection request packet and a repeater name according to a repeating route control table which stores correspondence between an address of said destination terminal and an address of another repeater provided to transfer the data to the address;

making a determination of a next (stage) repeater with reference to said repeating route control table based on said comparison; and transmitting a connection confirming packet to said destination terminal, a packet making said terminal transmit another connection request packet based on said determination.

15. The computer program according to claim 14, further causing said computer to perform the step of:

changing contents of said repeating route control table according to information received via at least one of said networks.

16. The computer program according to claim 15, wherein said changing step further includes changing said contents depending on a load condition, a fault condition or a designation of application running on said at least one terminal.

17. The computer program according to claim 16, wherein said storage medium is included in a server connected to said at least one terminal of said networks; and wherein said server transfers said computer program stored on said storage medium to said computer connected to said at least one terminal of said networks.

18. A computer program according to claim 14 wherein said connection confirming packet includes a code making the transmission terminal judge whether the connection to said destination terminal is completed or not.

19. A method for connecting two networks each being connected to at least one terminal, comprising the steps of:

receiving a connection request packet designating a destination terminal from a transmission terminal;

identifying a user by referring to a user information field stored in said connection request packet;

controlling access depending on at least one attribute of said user in said connection request packet according to an access control table which stores correspondence between at least one attribute of at least one user and accessible range of said networks; and transmitting said connection request packet to a next (stage) repeater provided to identify said user by referring to said user information field stored in said connection request packet.

20. The method according to claim 19, wherein said controlling access step includes checking said at least one attribute of said user in said connection request packet with said accessible range of said networks according to said access control table.

21. The method according to claim 20, further causing said computer to perform the steps of:

making a comparison between the destination terminal name field of said connection request packet and the repeater name according to a repeating route control table which stores correspondence between an address area including said destination terminal and an address of another repeater provided to transfer the data to said address area; and making a determination of the next (stage) repeater with reference to said repeating route control table based on said comparison.

22. The method according to claim 20, wherein said controlling access step further includes the sub step of:

combining said attributes of said user in said access control table according to a predetermined rule.

23. The method according to claim 22, wherein said attribute of said user in said access control table comprises at least one of a user name, an official position and a department.

24. The method according to claim 23, further causing said computer to perform the step of:

changing said attribute of said user in said access control table according to information received via said networks.

25. A method for connecting two networks each being connected to at least one terminal, comprising the steps of:

receiving a connection request packet designating a destination terminal from a transmission terminal;

making a comparison between the destination terminal name field of said connection request packet and a repeater name according to a repeating route control table which stores correspondence between an address of said destination terminal and an address of another repeater provided to transfer the data to the address;

making a determination of a next (stage) repeater with reference to said repeating route control table based on said comparison; and transmitting said connection request packet to said next (stage) repeater based on said determination.

26. The method according to claim 25, further causing said computer to perform the step of:

changing contents of said repeating route control table according to information received via at least one of said networks.

27. The method according to claim 26, wherein said changing step further includes changing said contents depending on a load condition, a fault condition of said repeater or a designation of application running on said at least one terminal.

28. A network system having at least two networks each being connected to at least one terminal, said network system comprising:

a transmission terminal for transmitting a connection request packet designating a destination terminal and including at least one user attribute in a user information field;

a repeater for connecting said networks to each other, said repeater comprising means for receiving said connection request packet, and means for identifying said user by referring to said user information field stored in said connection request packet;

a destination terminal for transmitting a connection confirming packet as a response to said connection request packet, said destination terminal comprising: means for receiving said connection request packet, and means for identifying said user by referring to said user information field stored in said connection request packet, said transmission terminal confirming that each of said repeater and said destination terminal identifies said user and a communication route between said transmission terminal and said destination terminal is established.

29. The network system according to claim 28, further comprising:

means for controlling access depending on at least one attribute of said user in said connection request packet, wherein said means for controlling access comprises: an access control table for storing correspondence between at least one attribute of at least one user and accessible range of said networks; and means for checking said at least one attribute of said user in said connection request packet with said accessible range of said networks according to said access control table.

30. The network system according to claim 29, wherein said repeater further comprises:

a repeating route control table for storing at least one correspondence between a first address area designated by excluding a specified address area and an address of another repeater provided to transfer the data to said first address area, and for storing correspondence between a second address area including said destination terminal and an address of another repeater provided to transfer the data to said second address area;

means for making a comparison between the destination terminal name field of said connection request packet and the destination terminal name according to said repeating route control table; and means for determining a next (stage) repeater with reference to said repeating route control table based on said comparison.

31. The network system according to claim 28, wherein said repeater further comprises means for transmitting said connection request packet to the next (stage) repeater based on access control information, said next (stage) repeater provided to identify said user referring to said user information field stored in said connection request packet.

32. The network system according to claim 28, wherein said repeater further comprises means for transmitting said connection confirming packet to said transmission terminal based on access control information.

* * * * *

UNITED STATES PATENT AND TRADEMARK OFFICE
CERTIFICATE OF CORRECTION

PATENT NO : 6,111,883
DATED : August 29, 2000
INVENTOR(S) : Masato TERADA et al., et al.

It is certified that error appears in the above-identified patent and that said Letters Patent are hereby corrected as shown below:

On title page, item 75 Inventors, replace "Tetsuya" with --Tatsuya--.
Column 12, line 31, replace "FIG. 21" with -- FIGs. 21A-21B --;

Column 12, line 32, replace "FIG. 21" with -- FIGs. 21A-21B --; and
Figure 21, please replace with Figures 21(A) and 21(B) as follows:

Signed and Sealed this

Eighth Day of May, 2001

NICHOLAS P. GODICI

Attest:

Attesting Officer

Acting Director of the United States Patent and Trademark Office

UNITED STATES PATENT AND TRADEMARK OFFICE
CERTIFICATE OF CORRECTION

PATENT NO. : 6,111,883

Page 2 of 2

DATED : August 29, 2000

INVENTOR(S) : Masato Terada et al.

It is certified that error appears in the above-identified patent and that said Letters Patent is hereby corrected as shown below:

Column 12, line 32, replace "FIG. 21" with -- FIGs. 21A-21B --; and
Figure 21, please replace with Figures 21(A) and 21(B) as follows:

FIG. 21a

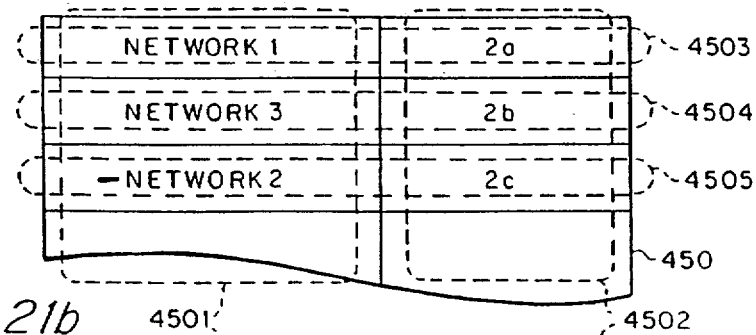

FIG. 21b